United States Patent
Sugawara et al.

(10) Patent No.: US 7,280,854 B2
(45) Date of Patent: Oct. 9, 2007

(54) PORTABLE INFORMATION TERMINAL CRADLE APPARATUS

(75) Inventors: Ken Sugawara, Hachioji (JP); Kunio Yamamiya, Sagamihara (JP); Keito Fukushima, Mitaka (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 68 days.

(21) Appl. No.: 11/150,571

(22) Filed: Jun. 10, 2005

(65) Prior Publication Data

US 2005/0287852 A1    Dec. 29, 2005

(30) Foreign Application Priority Data

Jun. 15, 2004 (JP) ............... 2004-177441
Oct. 5, 2004 (JP) ............... 2004-292140

(51) Int. Cl.
*H04Q 7/32* (2006.01)

(52) U.S. Cl. ............... 455/575.1; 455/550.1; 455/557; 455/556.1; 455/347; 455/66.1; 455/90.3; 455/556.2; 345/168; 345/169; 379/433.01; 379/433.11

(58) Field of Classification Search .......... 455/575.1, 455/550.1, 557, 556.1, 556.2, 575.4, 90.3, 455/90.2, 403, 422.1, 500, 517, 66.1, 90.1, 455/344, 347, 351, 572; 379/433.01, 433.03, 379/428.01, 428.02, 428.04, 433.11, 433.13, 379/440, 453, 454; 345/168, 169
See application file for complete search history.

(56) References Cited

U.S. PATENT DOCUMENTS

| 2003/0025674 | A1* | 2/2003 | Watanabe | 345/168 |
| 2003/0071915 | A1 | 4/2003 | Kanamori | |
| 2004/0105024 | A1 | 6/2004 | Takahashi | |

FOREIGN PATENT DOCUMENTS

| JP | 2000-350143 A | 12/2000 |
| JP | 2002-252801 A | 9/2002 |
| JP | 2002-374447 A | 12/2002 |
| JP | 2003-068394 A | 3/2003 |
| JP | 2003-283975 A | 10/2003 |
| JP | 2003-333403 A | 11/2003 |
| JP | 2003-335023 A | 11/2003 |
| JP | 2004-179857 A | 6/2004 |
| JP | 2004-194289 A | 7/2004 |
| JP | 02003249063 | * 9/2006 |

* cited by examiner

*Primary Examiner*—Keith Ferguson
(74) *Attorney, Agent, or Firm*—Frishauf, Holtz, Goodman & Chick, P.C.

(57) ABSTRACT

A portable information terminal device cradle apparatus includes a recording/reproducing apparatus for recording and reproducing data using a recording disk, disposed in an inner space enclosed by an enclosure including an upper plate and a lower plate, a main part of a connector for a connection with a portable information terminal device and/or a cradle assembly placed on the upper plate, and a connector holding part for holding the main part of the connector such that the main part of the connector is rotatable with respect to the upper plate.

12 Claims, 26 Drawing Sheets

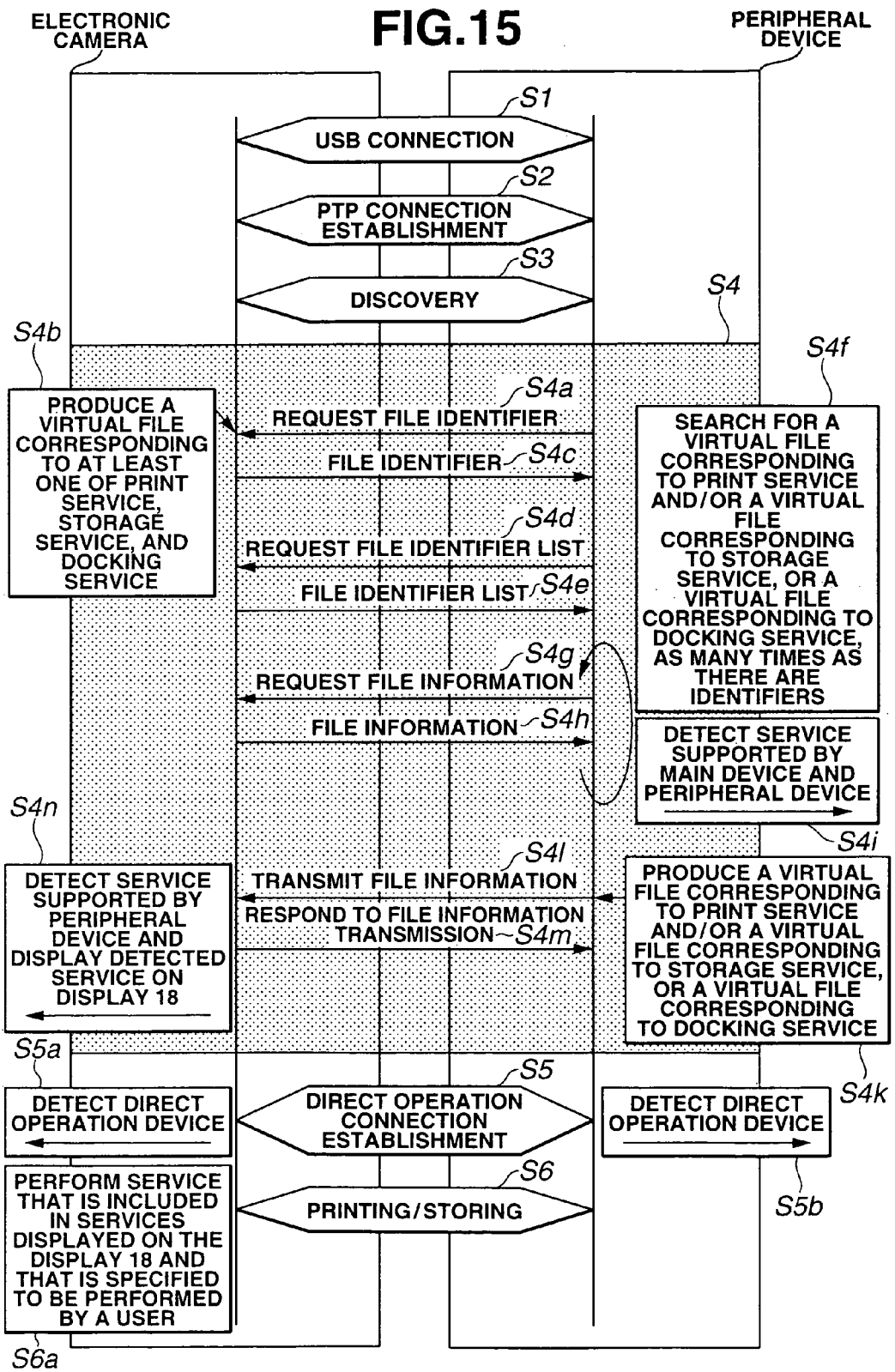

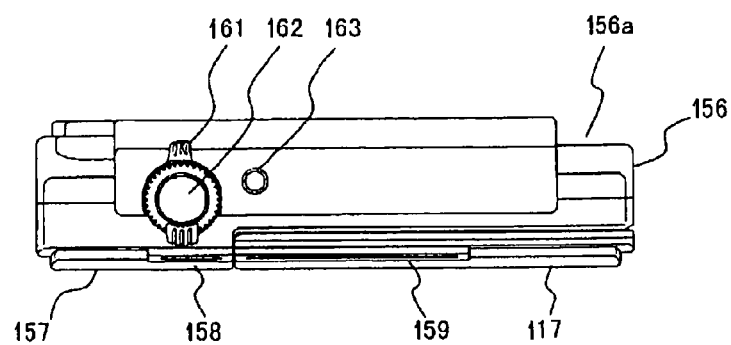
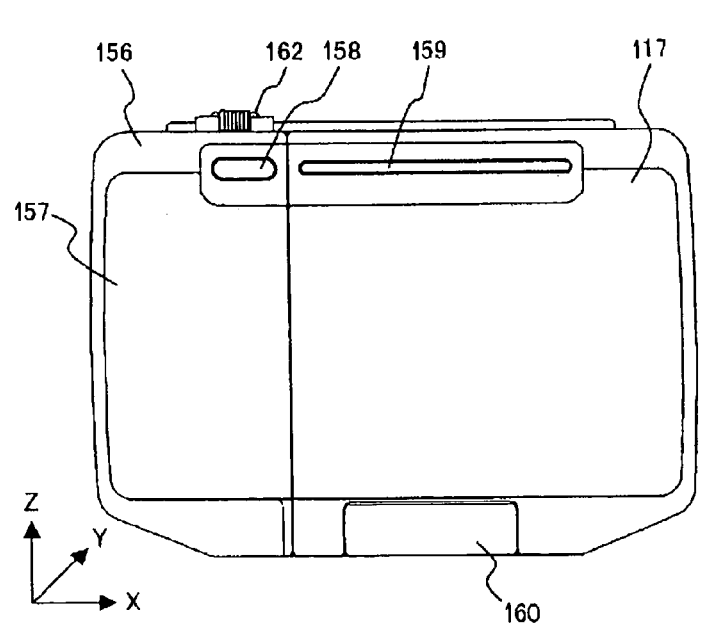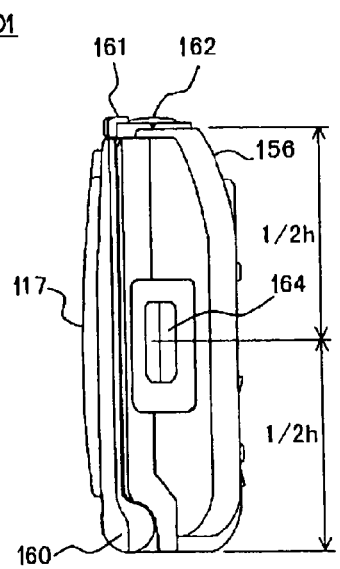

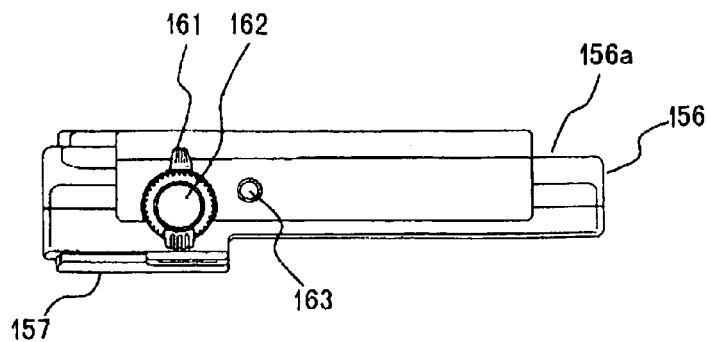
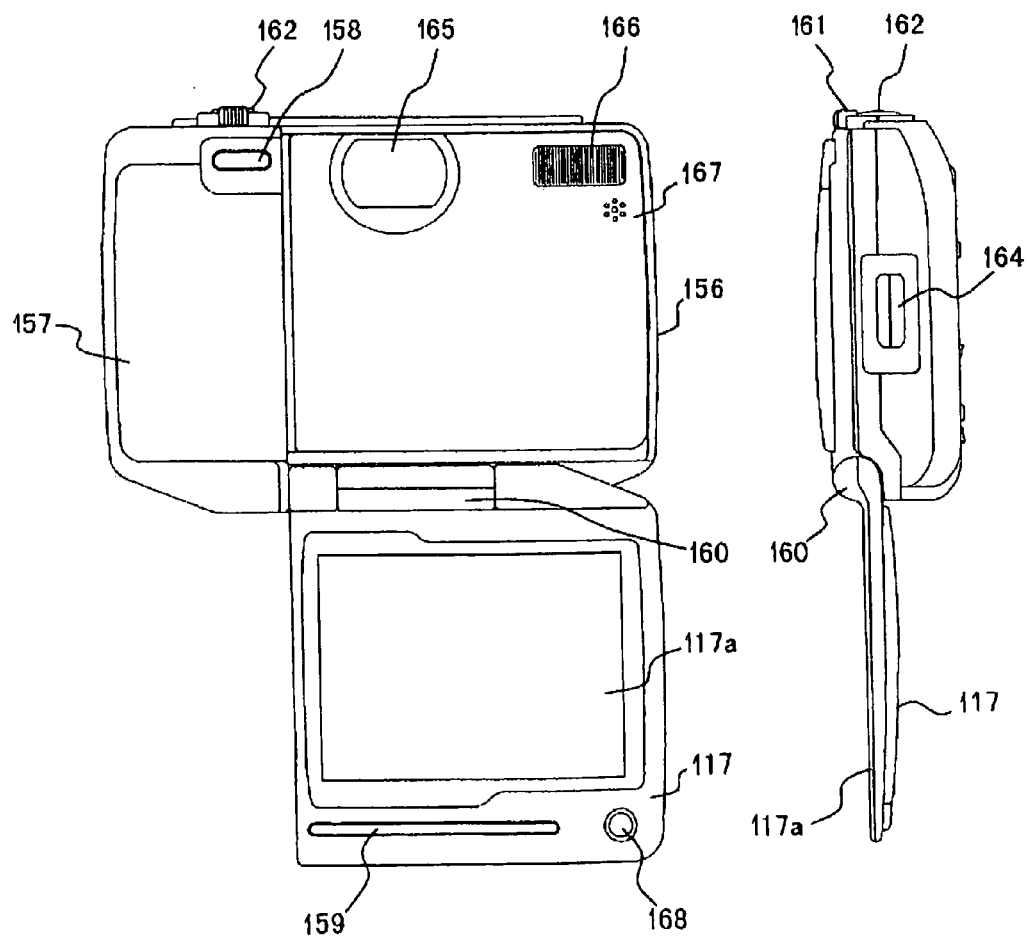

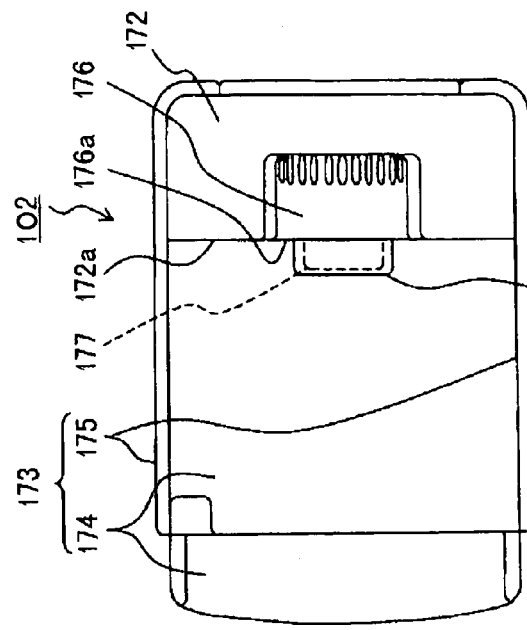
FIG.19A
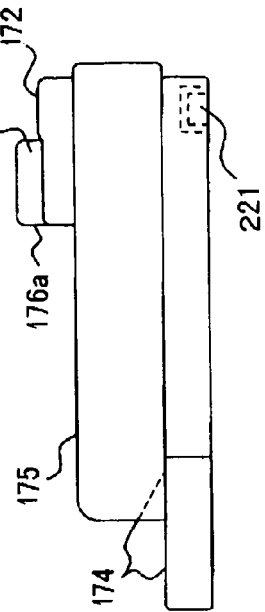
FIG.19D
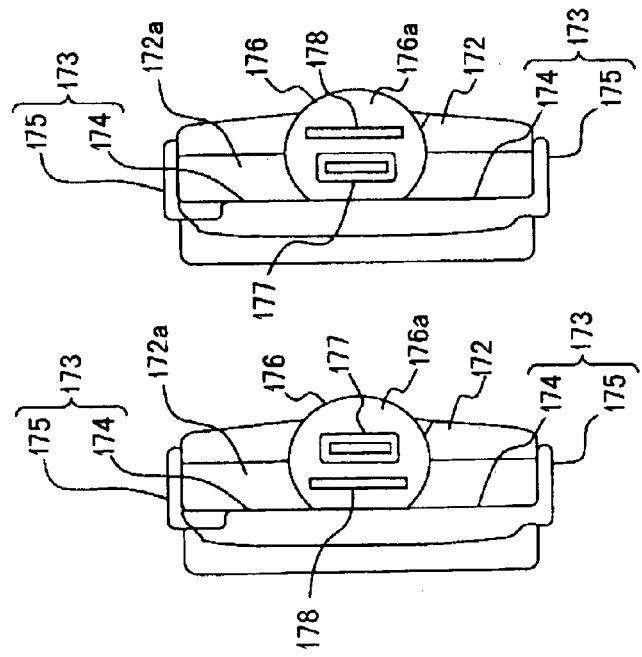
FIG.19B
FIG.19C

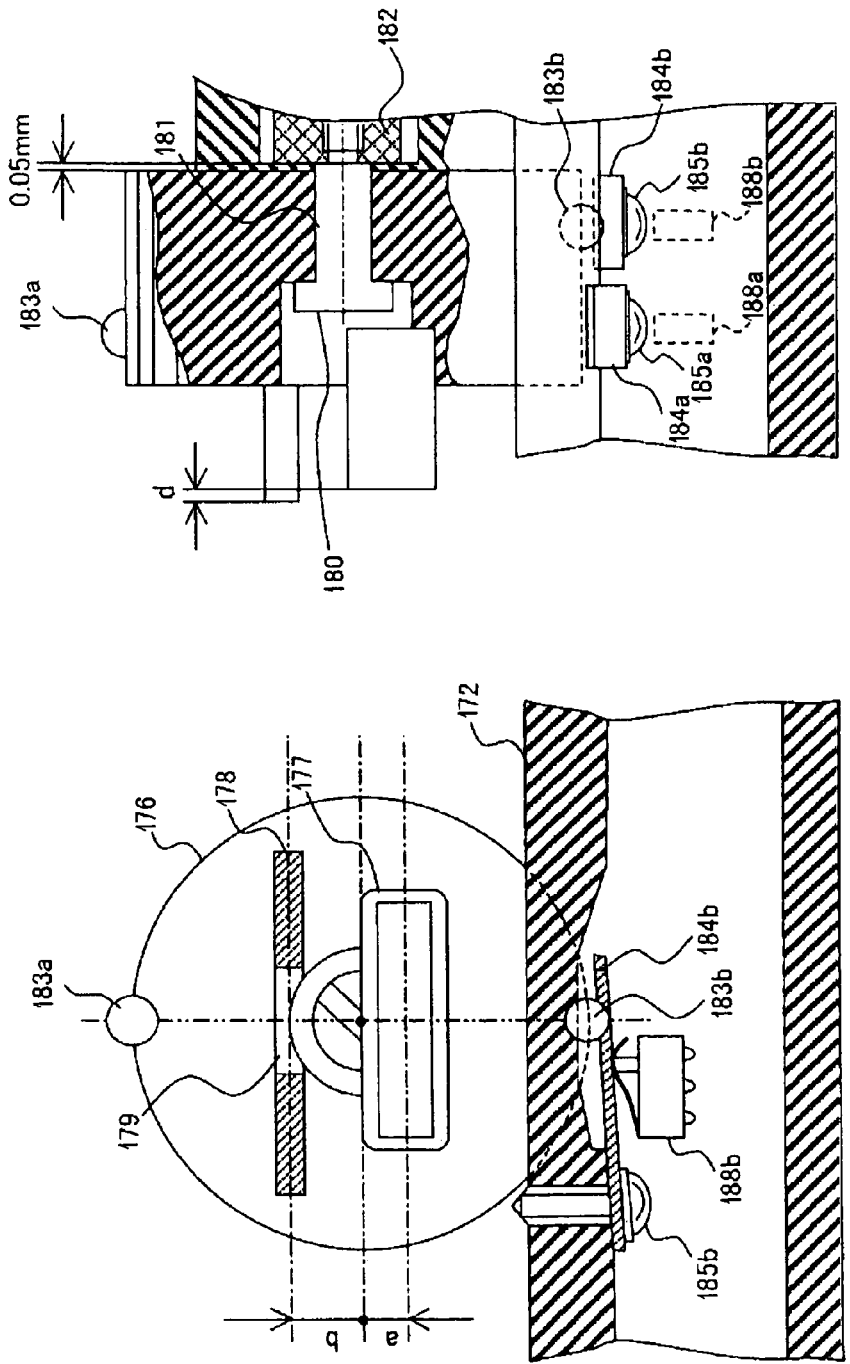

PORTABLE INFORMATION TERMINAL CRADLE APPARATUS

This application claims benefit of Japanese application No. 2004-177441 filed in Japan on Jun. 15, 2004 and No. 2004-292140 filed in Japan on Oct. 5, 2004 the contents of which are incorporated by this reference.

BACKGROUND OF THE INVENTION

1. Field of the Invention

The present invention relates to a portable information terminal device cradle apparatus having a connector for connection with a portable information terminal device.

2. Description of the Related Art

It is known to use a cradle apparatus such that an electronic camera is placed on the cradle apparatus and the electronic camera is connected to the cradle apparatus via connectors thereof to supply electric power to the electronic camera from the cradle apparatus and/or to perform communication between the electronic camera and the cradle apparatus.

For example, Japanese Unexamined Patent Application Publication No. 2003-333403 discloses an electronic camera capable of being placed on a cradle, in a position different from that in which the electronic camera is used in a normal mode. The cradle designed to cradle the electronic camera has a cradle connector disposed on the bottom of a camera attaching unit and adapted to be electrically connected to a connector for connection with an external device, disposed on the electronic camera.

A system is known in which image data stored in an electronic camera (hereinafter also referred to as a digital camera) is transferred to a storage device such as an optical disk device or a magnetic disk device or to a printer via a cradle without passing through a host computer, to storage the image data on the storage device or to print the image data by the printer.

Japanese Unexamined Patent Application Publication No. 2000-335023 discloses a printer capable of printing desired image data. This printer can store a large number of images captured by the digital camera on a general-purpose external storage device without using a mass storage device disposed in a computer. More specifically, the printer has a first input port adapted to receive a user interface and a memory card is connected via a cable to an optical magnetic disk AV deck having the user interface, and the optical magnetic disk AV deck is connected to a TV monitor via the cable.

Japanese Unexamined Patent Application Publication No. 2002-374447 discloses a cradle apparatus having a memory card slot for use by an information device or the digital camera or having a built-in hard disk. This cradle apparatus further has a speaker, an audio output terminal, a device attaching part for removably holding an information device, and communication means for communicating with the information device attached to the device attaching part. The cradle apparatus also has display means for displaying information (such as an image) on a liquid crystal display in accordance with data received from the information device via the communication means. When devices are connected in a state that allows image data to be transferred from a PC (Personal Computer) connected to the cradle apparatus via a USB (Universal Serial Bus) connection terminal to the memory card disposed in the camera or the cradle apparatus or to a large-capacity storage device (such as a hard disk device) and stored therein, the liquid crystal display is automatically turned off by control means disposed in the cradle apparatus.

Japanese Unexamined Patent Application Publication No. 2003-283975 discloses details of a structure of a cradle apparatus. For example, an LED 5 is turned on/off in accordance with a command transmitted from the digital camera via an LED-CTR terminal. When a button on the cradle apparatus is pressed, a request for starting of a USB communication is transmitted to the digital camera. When a CPU in the digital camera receives the request, the CPU outputs image data and attribute data from the digital camera 1. The output image data and attribute data are acquired by the PC via the cradle apparatus. The cradle apparatus also has a selector for switching between a charging unit and a second connector.

Japanese Unexamined Patent Application Publication No. 2000-350143 discloses an image recording/reproducing apparatus in which the CPU for controlling an infrared communication controller is installed in the cradle or the digital camera for user's ease of use. When this image recording/reproducing apparatus is not connected to a DVD recording/reproducing apparatus for storing image data, image data stored in the memory card or the like of the digital camera can be displayed on a television set.

In a conventional portable information terminal device with the cradle, such as the electronic camera, a PDA (Personal Digital Assistant) device, or a photo viewer for viewing a photo image with audio data, communication between the portable information terminal device and the host computer is performed in accordance with the USB communication standard, and a peripheral device such as the printer can be connected to the cradle.

SUMMARY OF THE INVENTION

The present invention provides a portable information terminal device cradle apparatus comprising a recording/reproducing apparatus for recording and reproducing data using a recording disk, disposed in an inner space enclosed by an enclosure including an upper plate and a lower plate, a main part of a connector for a connection with a portable information terminal device and/or a cradle assembly placed on the upper plate, and a connector holding part for holding the main part of the connector such that the main part of the connector is rotatable with respect to the upper plate. In this portable information terminal device cradle apparatus, the connector is protected when the electronic camera or the cradle assembly is not connected to the portable information terminal device cradle apparatus. Thus, connection terminals of the connector are prevented from being contaminated with dust or the like in the state in which the electronic camera or the cradle assembly is not connected to the portable information terminal device cradle apparatus.

The above and other objects, features and advantages of the invention will become more clearly understood from the following description referring to the accompanying drawings.

BRIEF DESCRIPTION OF THE DRAWINGS

FIGS. 1 to 10B are diagrams associated with a first embodiment of the present invention;

FIG. 1 is a diagram showing a camera cradle apparatus whose lid is in a closed state;

FIG. 2 is a diagram showing the camera cradle apparatus whose lid is in an open state in which a connector is exposed;

FIG. 3 is a diagram showing a connector and an HDD disposed in an inner space formed between an upper plate and a lower plate of the camera cradle apparatus;

FIG. 4 is a diagram showing the connector disposed on the upper plate of the camera cradle apparatus;

FIG. 5 is a diagram showing the connector disposed on the upper plate of the camera cradle apparatus;

FIG. 6 is a cross-sectional view taken along a line VI-VI of FIG. 5, showing the relationship between the connector and the lid in the closed state;

FIG. 7 is a cross-sectional view taken along a line VII-VII of FIG. 5;

FIG. 8 is a cross-sectional view taken along the line VI-VI of FIG. 5, showing the relationship between the connector and the lid in the open state, in contrast to the closed state in FIG. 6;

FIG. 9 is a diagram showing another example of a structure of the camera cradle apparatus;

FIG. 10B is a diagram showing relative positions of the lid, the stopper for stopping the connector in a position in which connection terminals of the connector face in a direction obtained by further rotating the connector beyond the vertical position, and the open-position setting unit;

FIGS. 11 to 28D are diagrams associated with a second embodiment of the present invention;

FIG. 11 is a diagram showing main parts of a system including an information processing apparatus;

FIG. 12 is a perspective view showing an external appearance of the information processing apparatus in a state in which a tray is in a drawn-out position;

FIG. 13 is a diagram showing a display having various keys disposed on the back surface of an electronic camera in the system;

FIG. 14 is a diagram showing a processing flow of transferring and handling of data associated with services performed between the electronic camera and a peripheral device;

FIG. 15 is a diagram showing an example of a processing flow performed after a service performable between the electronic camera and the peripheral device is detected in the flow shown in FIG. 14;

FIG. 16A is a front view of the electronic camera whose display is in a closed position;

FIG. 16B shows a right-hand side view of the electronic camera whose display is in the closed position;

FIG. 16C shows a top view of the electronic camera whose display is in the closed position;

FIG. 17A shows a front view of the electronic camera whose display is in a fully-opened position;

FIG. 17B shows a right-hand side view of the electronic camera whose display is in the fully-opened position;

FIG. 17C shows a top view of the electronic camera whose display is in the fully-opened position;

FIG. 19A shows a top view of a docking station;

FIG. 19B shows a front view of the docking station;

FIG. 19C shows a front view of the docking station in a state in which a rotating part shown in FIG. 19B is in a 180°-rotated position;

FIG. 19D shows a right-hand side view of the docking station;

FIG. 21A is a front view, partially cross sectioned, of the docking station, for illustrating a detection mechanism;

FIG. 21B is a right-hand side view, partially cross sectioned, of the docking station, for illustrating the detection mechanism;

FIG. 22 is a diagram partially illustrating another mechanism for detection of a state in which the electronic camera is placed;

FIG. 25 is a flow chart showing a switching operation of the docking station performed when the electronic camera is attached to the docking station;

FIG. 26 is a perspective view partially showing an information processing apparatus in a state in which an opening-and-closing lid of an upper plate is opened;

FIG. 27 is a diagram showing a structure of the opening-and-closing lid and a structure of a USB connector;

FIG. 28D shows an example of a manner in which information is displayed on the display of the electronic camera when a printing operation is completed.

DETAILED DESCRIPTION OF THE PREFERRED EMBODIMENTS

The present invention is described in further detail below with reference to embodiments in conjunction with the accompanying drawings.

First, with reference to FIGS. 1 to 10B, a first embodiment of the present invention is described.

Figure 1:
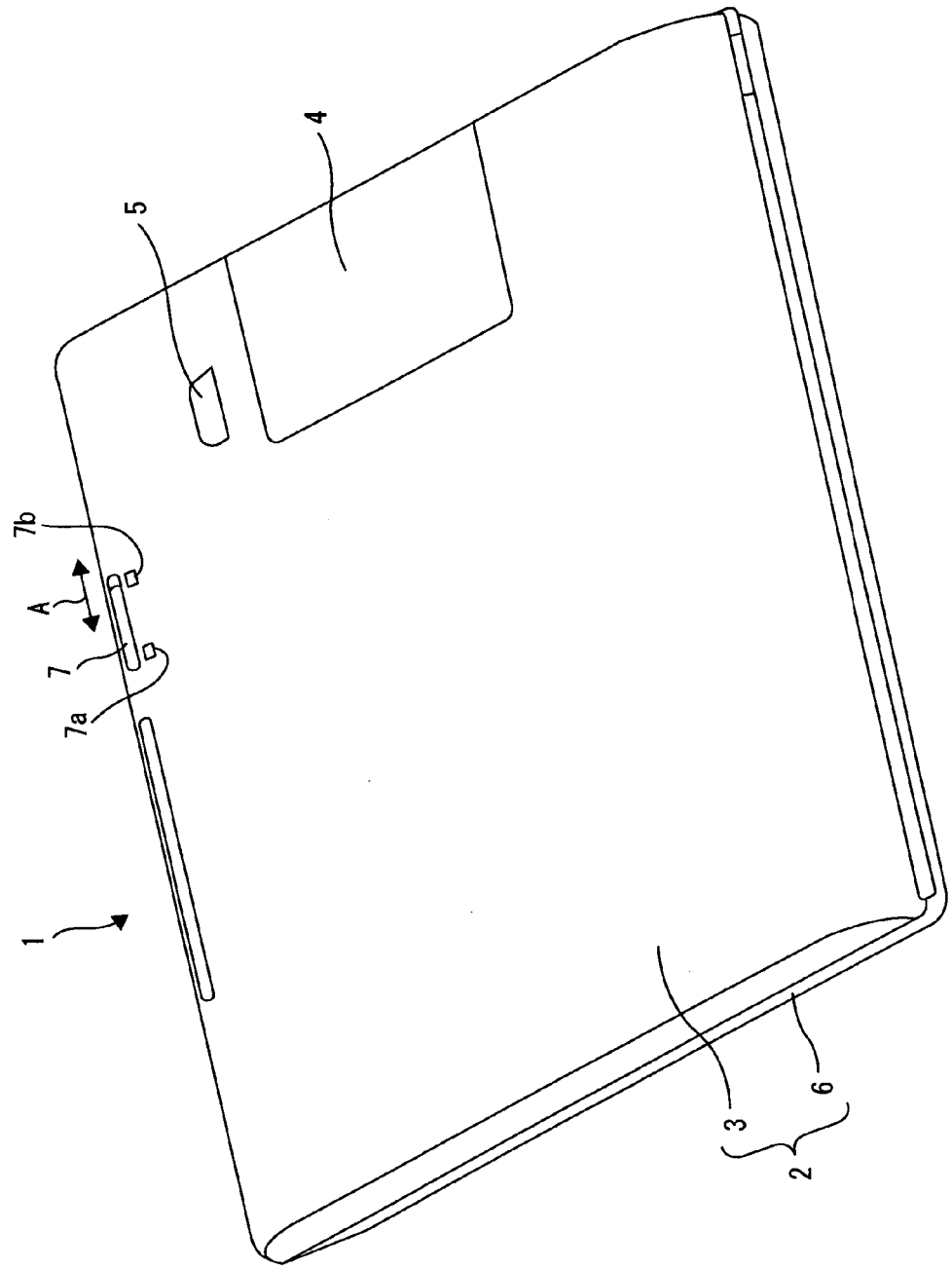

FIG. 1 shows a camera cradle apparatus 1, which is a portable information terminal device cradle apparatus according to the present embodiment. An openable/closable lid 4 is disposed on an upper plate 3 of an enclosure 2 of the camera cradle apparatus 1. When a switch terminal 5 is pressed, the lid 4 moves from a closed position shown in FIG. 1 into an open position as shown in FIG. 2.

A reference numeral 6 denotes a lower plate which is a part of the enclosure 2, and a reference numeral 7 denotes a selection switch. The selection switch 7 is slidable to a position closer to an LED lamp 7a or a position closer to an LED lamp 7b, as shown by an arrow A. When the selection switch 7 is slid to the position closer to the LED lamp 7a, the LED lamp 7a is turned on.

In this state in which the LED lamp 7a is lit, when an electronic camera (not shown) is placed in a predetermined position on the upper plate 3 and the indication on the electronic camera placed on the upper plate 3 is set to a copy mode, image data stored in the electronic camera is transferred to an HDD that will be described later. On the other hand, when the selection switch 7 is slid into the position closer to the LED lamp 7b, the LED lamp 7b is turned on. In this state, when a request for image data stored in the electronic camera is issued from a personal computer (Hereinafter, referred to as a PC) (not shown) connected to the camera cradle apparatus 1, the image data stored in the electronic camera is transferred to the PC.

Figure 2:
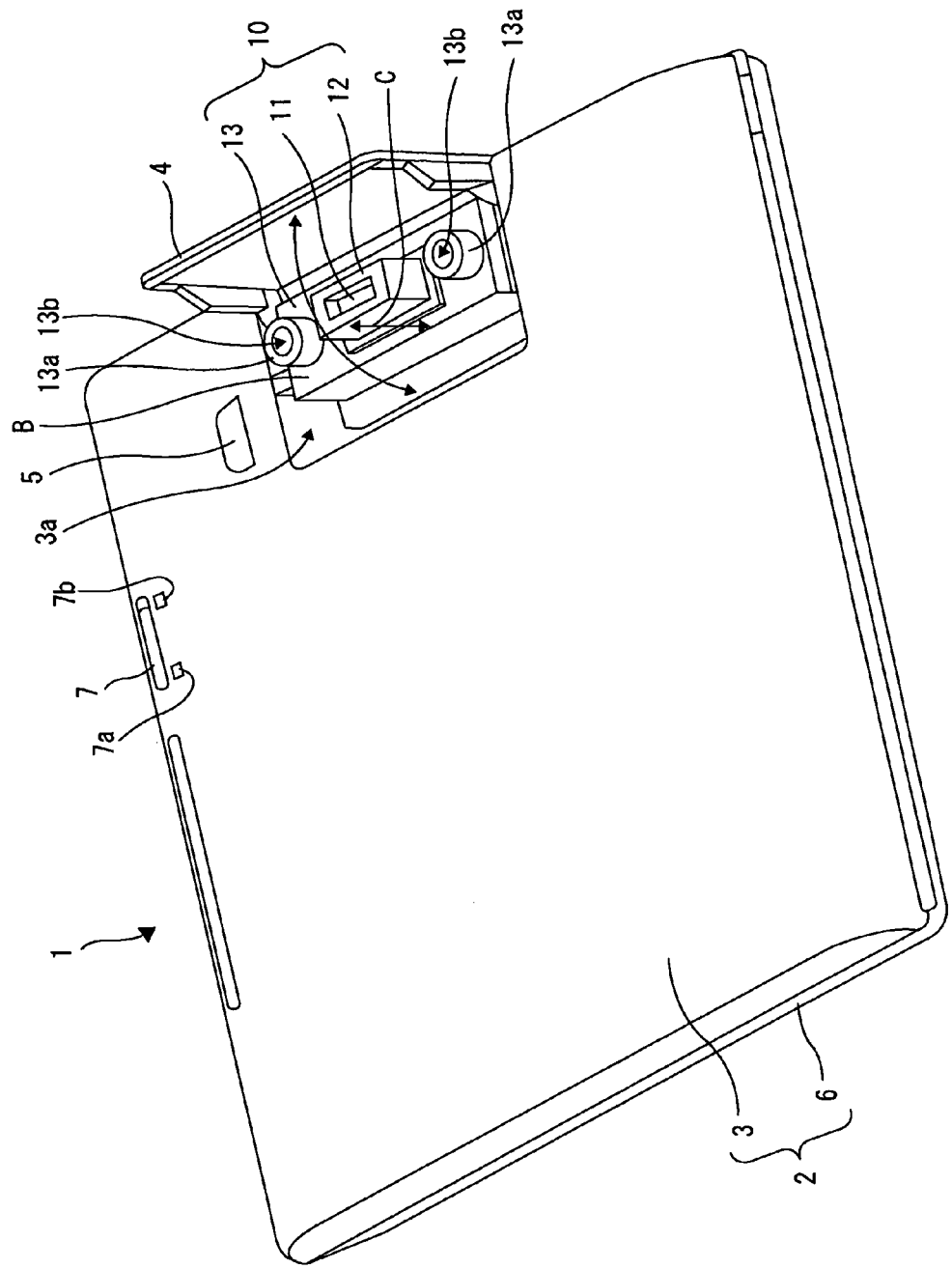

The lid 4 is rotatable as shown by an arrow B in FIG. 2. When the lid 4 is moved into the open position shown in FIG. 2, a camera-side connector (hereinafter, referred to simply as a connector) 10 is exposed in an opening 3a formed in the upper plate 3 and moves into a vertical position in which connection terminals (not shown) of a main part 11 of the connector face upward.

The connection terminals of the main part 11 of the connector constituting the connector 10 are protected from exposure by a connector protection cover (hereinafter, referred to simply as a protective cover) 12. The protective cover 12 is slidable up and down as shown by an arrow C in FIG. 2. More specifically, when the electronic camera is placed on the upper plate 3, the protective cover 12 is slid downward.

The connector 10 includes a first connector holding part (hereinafter, referred to as a first holding part) 13 having a pair of positioning protrusions 13a. The positioning protrusions 13a are fitted into guide holes formed at locations close to a connector for connection with an external device or close to an electronic camera (not shown). Each positioning protrusion 13a has a screw insertion hole 13b in which a fixing screw (17 (described later)) is to be fitted.

Figure 3:
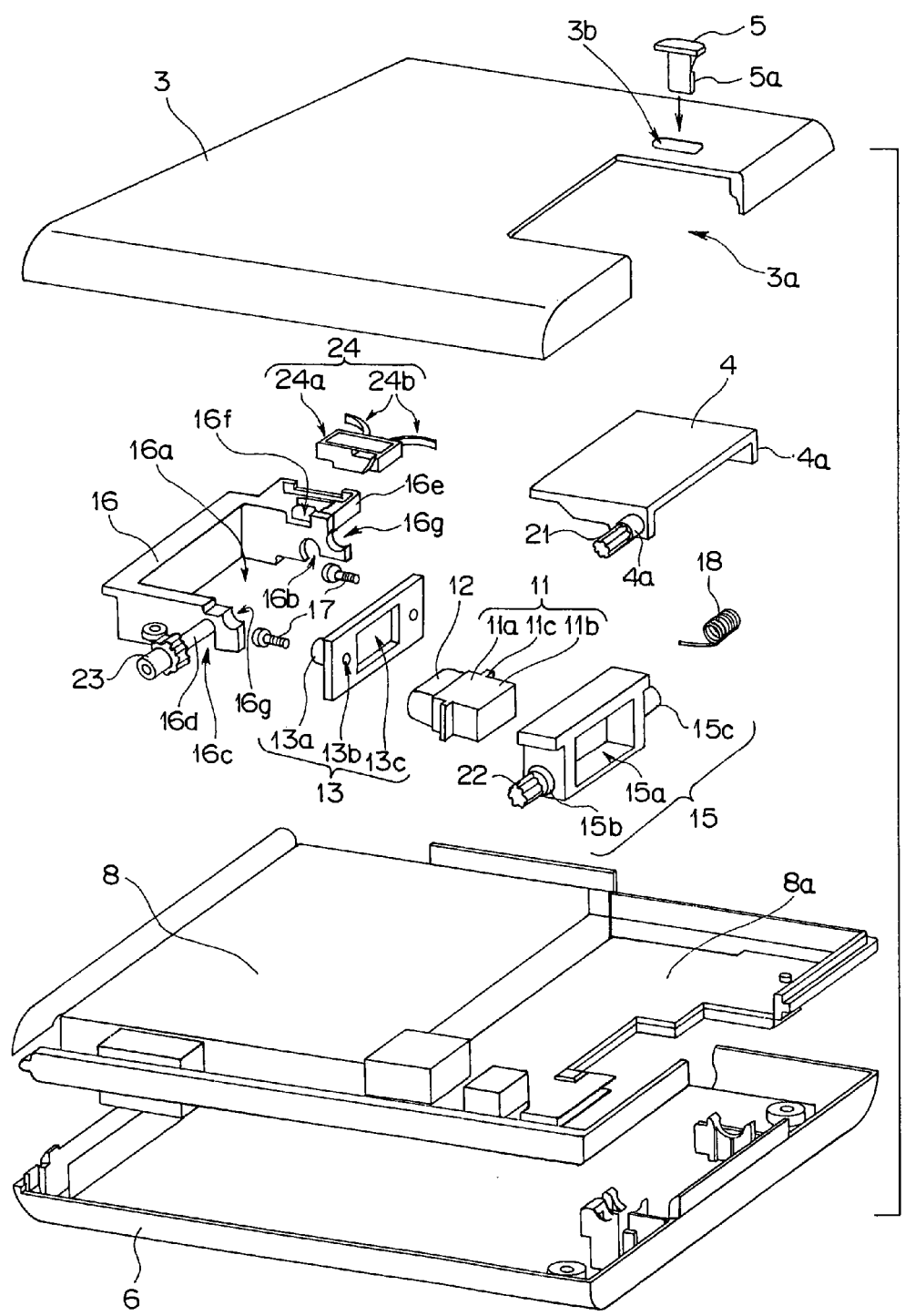

Referring to FIG. 3, the structure of the camera cradle apparatus 1 is described in further detail.

As shown in FIG. 3, the enclosure 2 of the camera cradle apparatus 1 includes the upper plate 3 and the lower plate 6. In an inner space formed between the upper plate 3 and the lower plate 6, there are disposed a hard disk drive (hereinafter, referred to as an HDD) 8, a fixing metal plate for supporting the HDD 8, the connector 10, a connector installation frame 16, and other parts. The HDD 8 serves as a recording/reproducing apparatus. The HDD 8 is disposed on a base plate 8a integrally formed with the HDD 8 and supported by the fixing metal plate. The connector 10 includes the main part 11 of the connector including the first holding part 13 and the protective cover 12, and a second connector holding part (hereinafter, referred to simply as the second holding part) 15. The connector 10 is rotatably supported by the connector installation frame 16.

The upper plate 3 has an opening 3a closed with the lid 4, and also has a through-hole 3b in which the switch terminal 5 is disposed. The switch terminal 5 has a T-like shape, and has an operation part 5a protruding from a particular position. The operation part 5a slides a connection terminal 24 (described later) shown in FIG. 3 in a predetermined direction against an urging force of the connection terminal 24.

The lid 4 is formed such that the opening 3a is closed with the lid 4 without substantially any gap therebetween. The lid 4 has protrusions 4a serving as holding parts (described later) formed on two respective side ends of the lid 4. On one protrusion 4a, a lid gear 21 having a particular number of teeth is formed in an integrated fashion.

In the center of the main part 11 of the connector having the protective cover 12, a flange 11c is formed such that the main part 11 of the connector is divided by the flange 11c into a front-end part 11a and a base-end part 11b.

The first holding part 13 is formed of a hard resin material with a flat plate shape. In a substantially central area of the first holding part 13, a rectangular hole 13c is formed in which the protective cover 12 is slidably disposed. The pair of the positioning protrusions 13a is formed on one side face of the first holding part 13.

The second holding part 15 is formed of a hard resin material. A cylindrical-shaped rotating support part 15b is disposed on each of two sides of the second holding part 15. A protrusion 15c, around which a helical torsion spring 18 for providing an urging force is disposed, is formed on an end of one rotating support part 15b. On the other rotating support part 15b, a connector gear 22 having a particular number of teeth is formed in an integral form. The second holding part 15 also has an internal thread (not shown) formed at a location corresponding to the location of the screw insertion hole 13b, and a recess (not shown) in which the flange 11c is disposed.

Figure 4:
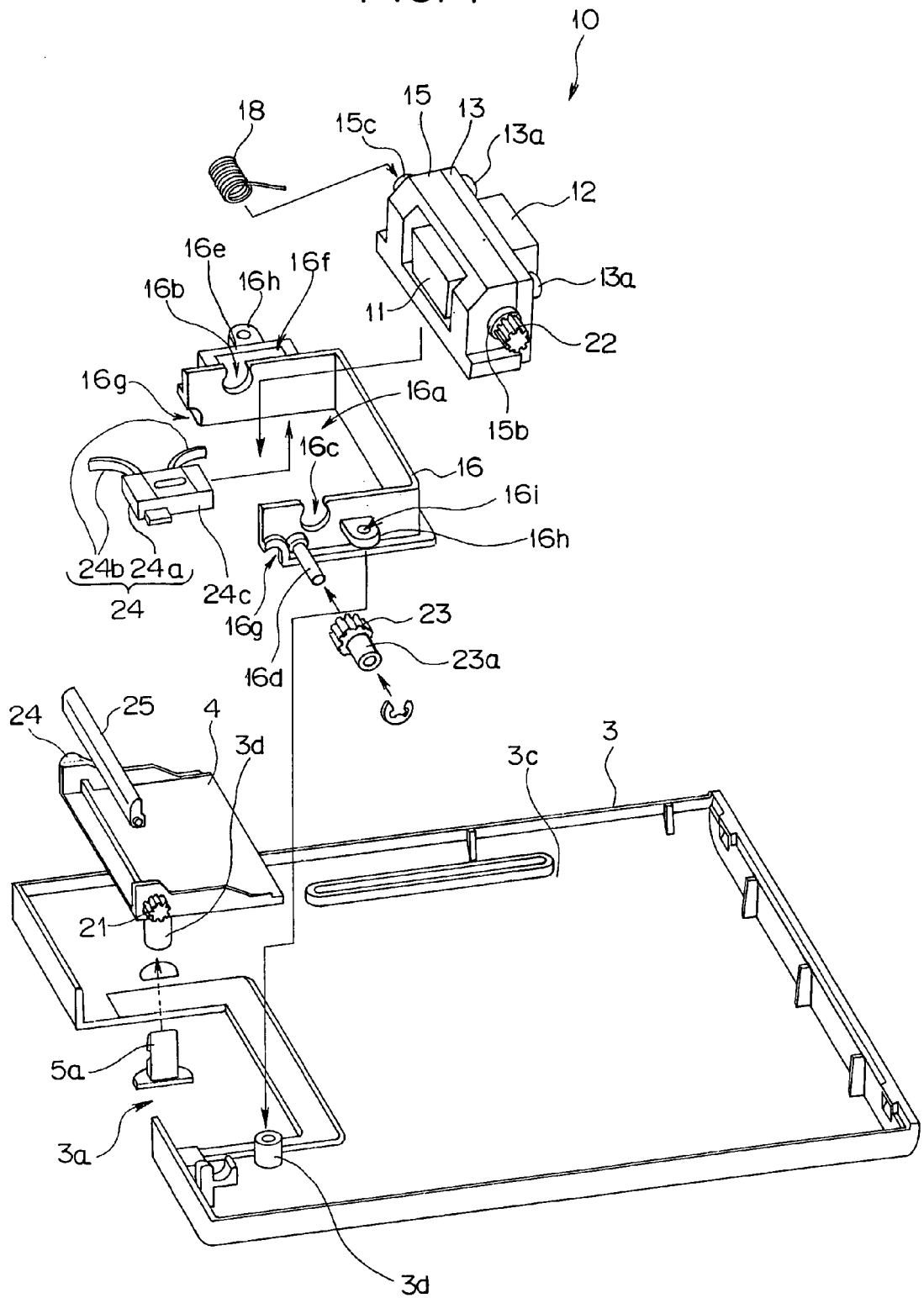

The front-end part 11a of the main part 11 of the connector is inserted in the rectangular hole 13c of the first holding part 13, and the base-end part 11b of the main part 11 of the connector is inserted in the second holding part 15. In this state in which these parts are combined together, a fixing screw 17 is inserted into the screw insertion hole 13b of the first holding part 13, and the fixing screw 17 is screwed with an internal thread formed in the second holding part 15 such that the main part 11 of the connector is supported by the first holding part 13 and the second holding part 15 therebetween thereby forming a complete connector 10 as shown in FIG. 4.

The connector installation frame 16 is formed in a rigid U-like shape using a solid resin material. The connector 10 is installed in the inner space 16a of the connector installation frame 16. The connector installation frame 16 has a pair of first supporting notches 16b and 16c in which rotating support parts 15b disposed on the second holding part 15 of the connector 10 are rotatably disposed. In the first supporting notch 16c, the shaft of the connector gear 22 is rotatably disposed.

A shaft 16d and a connection terminal installation unit 16e are disposed, at a location close to the first supporting notch 16c, on one side part of the connector installation frame 16. A transmission gear 23 with a particular number of teeth is disposed on the shaft 16d such that it is rotatable together with the shaft 16d. A frame 24a, which will be described in further detail later, of the connection terminal 24 slidable by the switch terminal 5 is disposed on the connection terminal installation unit 16e. The connection terminal installation unit 16e has a hole 16f.

The connector installation frame 16 also has a pair of second supporting notches 16g. The protrusions 4a of the lid 4 are rotatably disposed in the pair of the second supporting notches 16g.

The connection terminal 24 has the frame 24a and an urging part 24b. The frame 24a is disposed on the connection terminal installation unit 16e. The frame 24a has a hole 24c in which the operation part 5a of the switch terminal 5 is disposed via the hole 16f. The urging part 24b provides an urging force with a predetermined strength that causes the connection terminal 24 to be placed, at a particular position, in the connection terminal installation unit 16e of the connector installation frame 16.

The HDD 8 is capable of storing data transmitted from the electronic camera (not shown) connected to the main part 11 of the connector. The HDD 8 and the main part 11 of the connector are electrically connected to each other via a signal cable (not shown).

The manner in which the lid 4, the connector 10, the connector installation frame 16, and other parts are attached to the upper plate 3 is described with reference to FIG. 4.

The HDD 8 having the substrate 8a formed in an integral fashion, the fixing metal plate for supporting the HDD 8, and the connector installation frame 16 for rotatably supporting the connector 10, which are shown in FIG. 3, are attached to the upper plate 3.

First, as shown in FIG. 4, the upper plate 3 is placed such that the inner surface 3c faces upward as viewed in FIG. 4, and the lid 4 is attached to the upper plate 3 via a rotation shaft 25 such that the lid 4 is placed in the opening 3a.

Thereafter, to attach the connector installation frame 16 in which the connector 10 is disposed to the upper plate 3, the connector installation frame 16, the switch terminal 5, the connector 10, the helical torsion spring 18, the transmission gear 23, the connection terminal 24, and an E ring 26 are prepared. The rotating support parts 15b of the second holding part 15 of the connector 10 are placed in the respective first supporting notches 16b and 16c of the connector installation frame 16 such that the connector 10 is rotatably placed in the inner space 16a of the connector installation frame 16.

Thereafter, the transmission gear 23 is displayed on the shaft 16d of the connector installation frame 16 such that the transmission gear 23 meshes with the connector gear 22 of the rotating support part 15b. The E ring 26 is then fitted in a peripheral groove (not shown) formed on an end of the shaft 16d. As a result, the transmission gear 23 meshing with the connector gear 22 is disposed on the shaft 16d such that the transmission gear 23 is rotatable together with the shaft 16d.

The frame 24a of the connection terminal 24 is then placed on the connection terminal installation unit 16e of the connector installation frame 16. The connector installation frame 16 in this state is then plated at a predetermined position on the upper plate 3 such that the protrusion 4a is placed in the second supporting notch 16g of the connector installation frame 16, and a pair of fastening screw support parts 16h formed on the connector installation frame 16 are placed on the pair of connector fastening parts 3d each having an internal thread.

A fastening screw (not shown) is inserted through a hole 16i of a fastening screw fixing part 16h and the fastening screw is screwed with an internal thread of the connector fastening part 3d thereby fixing the connector installation frame 16 to the upper plate 3.

Figure 5:
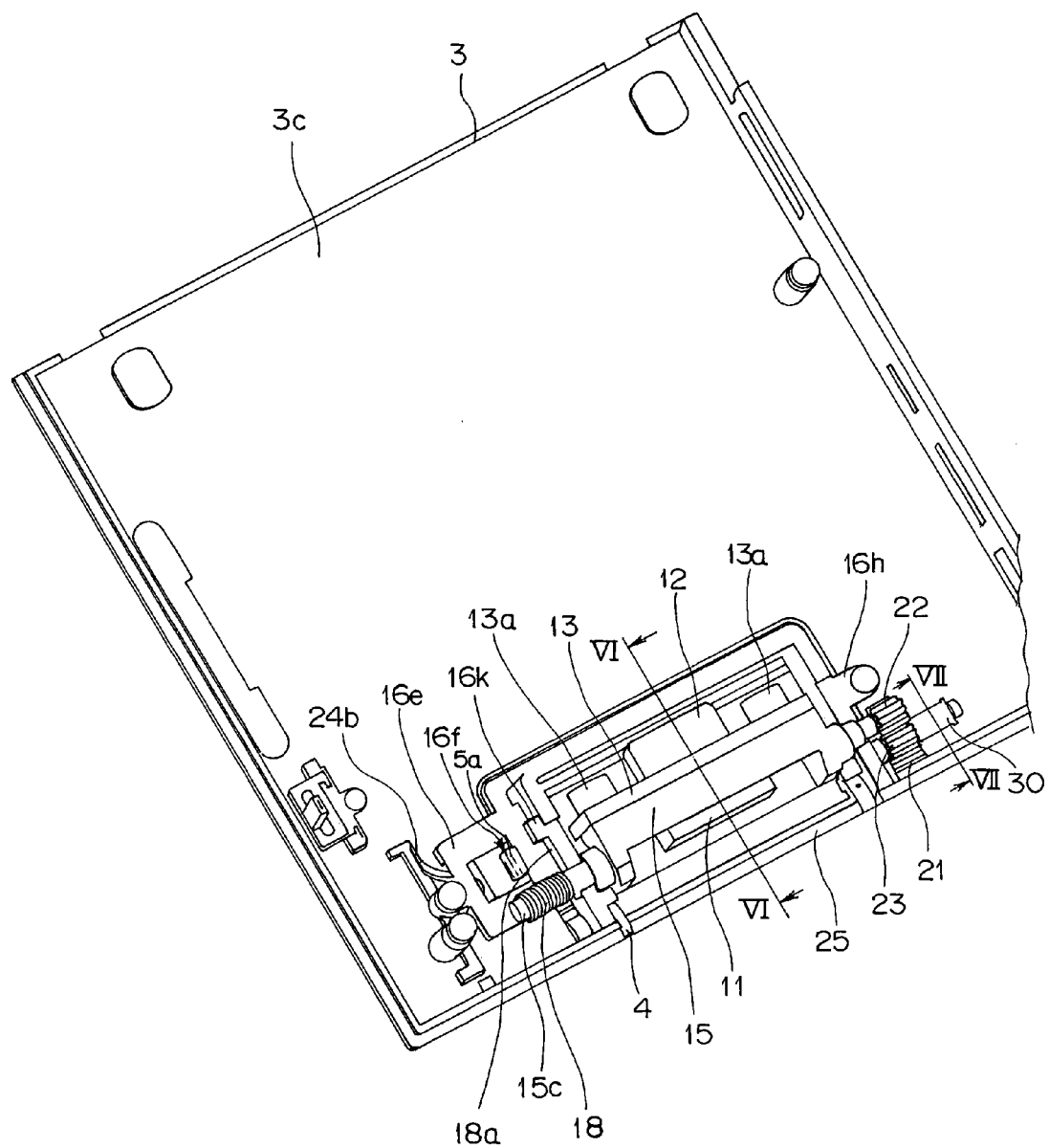
Figure 6:
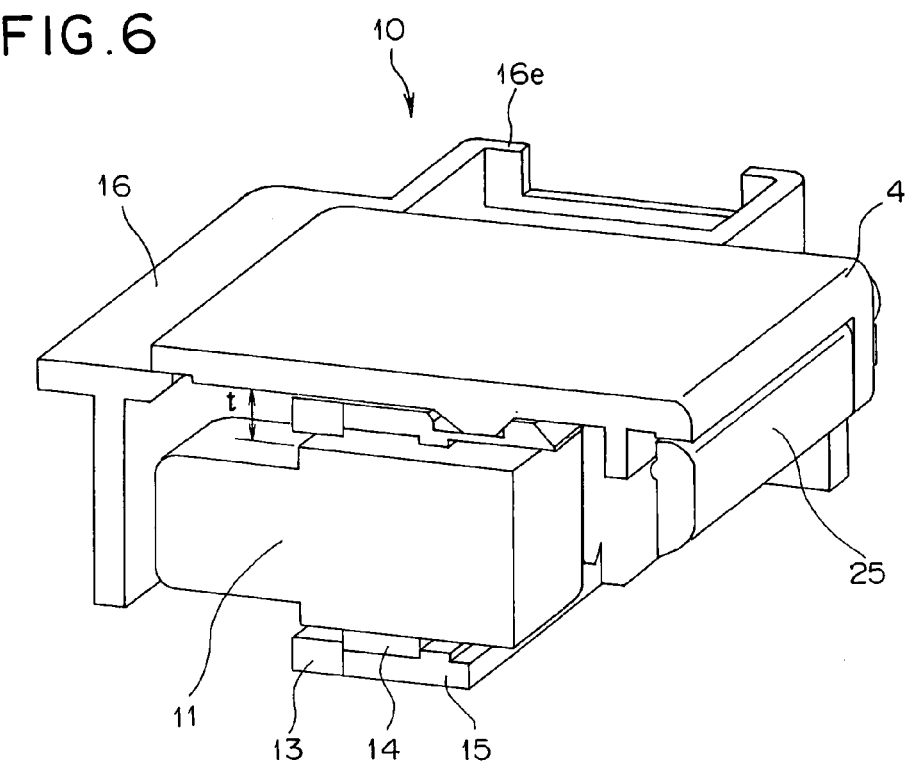

In the above assembling process, as shown in FIGS. 5 and 6, the connector installation frame 16 is installed such that connection terminals of the main part 11 of the connector constituting the connector 10 face horizontally, and such that the lid gear 21 meshes with the transmission gear 23, and thus the lid gear 21, the transmission gear 23, and the connector gear 22 form a power transmission mechanism serving as an operatively connecting mechanism. This power transmission mechanism is in the form of a gear transmission mechanism including a gear train whereby the lid 4 is opened or closed when the second holding part 15 of the connector 10 is turned by the urging force, and, conversely, the second holding part 15 of the connector 10 rotates when the lid 4 is manually opened or closed.

Figure 7:
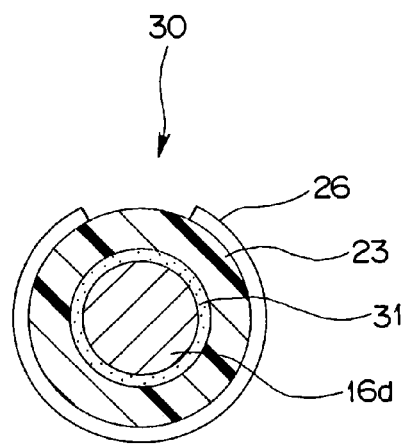

As shown in FIG. 7, the shaft 16d, on which the transmission gear 23 of the gear transmission mechanism is provided, has a damper 30. The damper 30 includes silicone-gel material 31 for controlling the speed at which the lid 4 is opened. The provision of the damper 30 allows the lid 4 to move in a desirable manner from its closed position into an open position.

Thereafter, the operation part 5a of the switch terminal 5 is inserted into the through-hole 3b from the outer side of the upper plate 3. The helical torsion spring 18 is then placed around the protrusion 15c and one end 18a of the helical torsion spring 18 is hooked to a protrusion 16k as shown in FIG. 5, and the operation part 5a is hooked to a location close the opening 16f such that the main part 11 of the connector held by the holding parts 13 and 15 of the connector 10 is urged by the helical torsion spring 18 into a position in which a side, on which connection terminals are formed, of the main part 11 of the connector faces horizontally.

Thereafter, the HDD 8 and the fixing metal plate are fixed to the upper plate 3, at a predetermined location. Thus, attaching of the connector 10 and the HDD 8 to the upper plate 3 is completed.

Finally, the lower plate 6 is fixed to the upper plate 3 into a single piece. As a result, the camera cradle apparatus 1 in the form shown in FIG. 1 is obtained.

The operation of the connector 10 provided in the camera cradle apparatus 1 is described below.

In the camera cradle apparatus 1, the lid gear 21, the transmission gear 23, and the connector gear 22 mesh with each other. Therefore, in the state shown in FIG. 1, when the switch terminal 5 is pressed by a user, the frame 24a of the connection terminal 24 is moved against the urging force of the urging part 24b. As a result, the closed state of the lid 4 is released, and the lid 4 becomes rotatable about the rotation shaft 25 into an open state.

When the lid 4 becomes rotatable, the urging force provided by the helical torsion spring 18 causes the second holding part 15 to start to rotate. That is, the second holding part 15, which holds the main part 11 of the connector in cooperation with the first holding part 13, starts to rotate about the rotating support part 15b. As a result, the main part 11 of the connector gradually rotates from the position in which the side having the connection terminals faces horizontally toward a position in which this side faces upward.

As the second holding part 15 rotates, the connector gear 22 rotates, and the rotation of the connector gear 22 is transmitted to the lid gear 21 via the transmission gear 23 having the damper 30. As a result, the lid 4 moves into the open position as the rotation of the second holding part 15.

Figure 8:
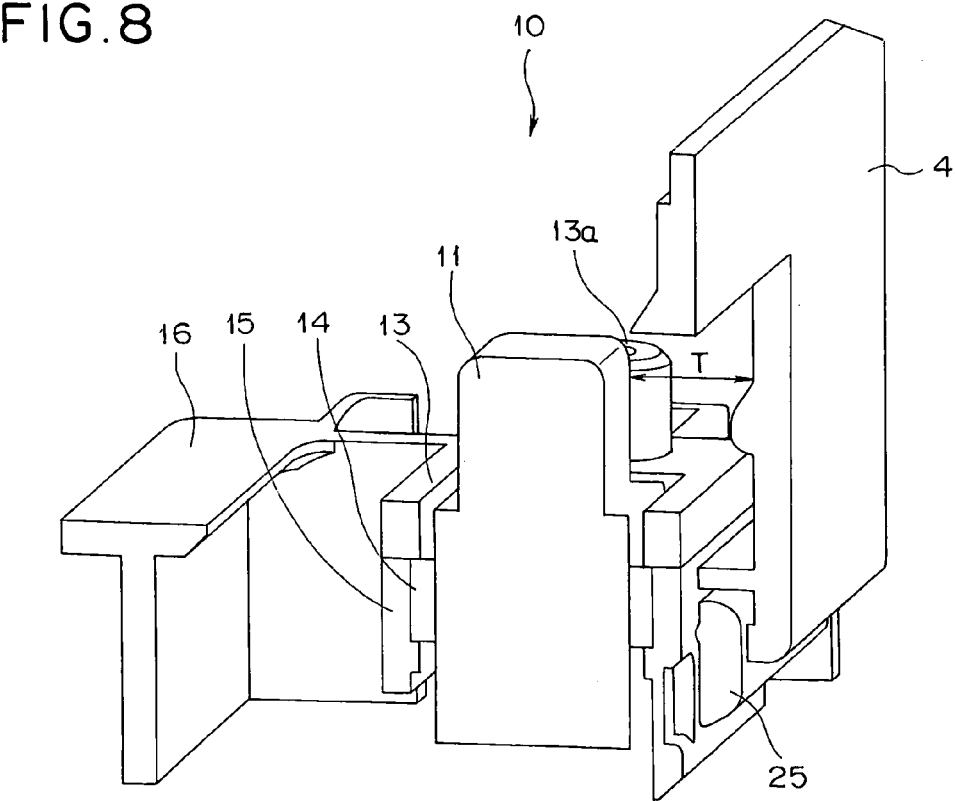

When the second holding part 15 holding the main part 11 of the connector comes into contact with the rotation shaft 25 as shown in FIG. 2 or 8, the rotation of the second holding part 15 stops. Thus, the lid 4 comes to rest in the open position, in which the connection terminals of the main part 11 of the connector face upward.

In this state, the electronic camera (not shown) is placed on the upper plate 3 such that a side face of the electronic camera comes to a position along the lid 4. As a result, the positioning protrusion 13*a* is inserted in a guide hole formed in the electronic camera or the cradle, and the connector, for connection with an external device, of the electronic camera and the main part 11 of the connector are electrically connected to each other. In this state, image data stored in the electronic camera is transferred to the HDD 8.

Thereafter, the connection between the connector, for connection with an external device, of the electronic camera and the main part 11 of the connector is released, and the lid 4 is moved from the open position into the close position. In this process, the lid 4 is first pushed toward the closed position against the urging force of the helical torsion spring 18. As a result, the lid gear 21 rotates, as the lid 4 moves toward the closed position.

The rotation of the lid gear 21 is transmitted to the connector gear 22 via the transmission gear 23 having the damper 30. Thus, the main part 11 of the connector turns as the lid 4 moves toward its closed position. When the lid 4 comes into the closed position, the frame 24*a* of the connection terminal 24 moves and the lid 4 is closed. Thus, the main part 11 of the connector is housed in the inner space formed between the upper plate 3 and the lower plate 6, in a state in which the connection terminals covered with the protective cover 12 of the main part 11 of the connector face horizontally.

In the present embodiment, the HDD 8 is used as the recording/reproducing apparatus disposed in the inner space between the upper plate 3 and the lower plate 6 of the enclosure 2, but the recording/reproducing apparatus is not limited to the HDD 8. In an example shown in FIG. 9, a camera cradle apparatus 1A has a table 8*b* on which to place a storage medium such as a CD-R, DVD-R, DVD-RW, or a DVD-RAM serving as the recording/reproducing apparatus.

In the present embodiment, the locations of the first supporting notches 16*b* and 16*c* in which the rotating support parts 15*b* are placed are set such that the gap T between the lid 4 and the main part 11 of the connector constituting the connector 10 in the state in which the lid 4 is in the open position as shown in FIG. 8 is greater than the gap t between the lid 4 and the main part 11 of the connector constituting the connector 10 in the state in which the lid 4 is in the closed position as shown in FIG. 6, that is, T>t.

In the present embodiment, as described above, the main part of the connector is held by the holding parts supported rotatably by the connector frame. In this structure, turning of the holding part causes the main part of the connector to be switched between a state in which the main part of the connector is housed in a horizontal position in the inner space enclosed by the enclosure and a state in which the main part of the connector is in a vertical position and exposed to the outside via the opening. When the main part of the connector is in the horizontal position and housed in the inner space enclosed by the enclosure, the main part of the connector is ensured to be protected, the total thickness of the apparatus is minimized by making effective use of space, and the connection terminals of the main part of the connector are prevented from being contaminated with dust or the like.

In the present embodiment, the opening where the main part of the connector is exposed is formed on the upper plate. And the lid is rotatably attached to the upper plate, in the opening of the upper plate. The lid is also operatively connected to the holding part that holds the main part of the connector by the gear transmission mechanism including a predetermined gear train. With the above arrangement, when the lid is at its opened position, the main part of the connector can provide the connecting state in which the main part of the connector is exposed via the opening, while when the lid is moved into its closed position, the main part of the connector moves into the horizontal position and housed in the inner space enclosed by the enclosure. In the state in which the main part of the connector is in the horizontal position and housed in the inner space, the opening is entirely closed with the lid. This ensures that the connection terminals of the main part of the connector are prevented from being contaminated with dust or the like, the main part of the connector is protected in a highly reliable fashion, the cradle apparatus can be easily carried, and the external appearance with the lid in the closed state becomes more good-looking.

Although in the structure of the cradle apparatus described above, when the second holding part 15 holding the main part 11 of the connector comes into contact with the rotation shaft 25, the turning of the second holding part 15 is stopped in the state in which the connection terminals of the main part 11 of the connector face upward and the lid 4 comes into the open position, the structure of the cradle apparatus is not limited to such a structure, but the cradle apparatus may be constructed as follows.

Figure 10A:
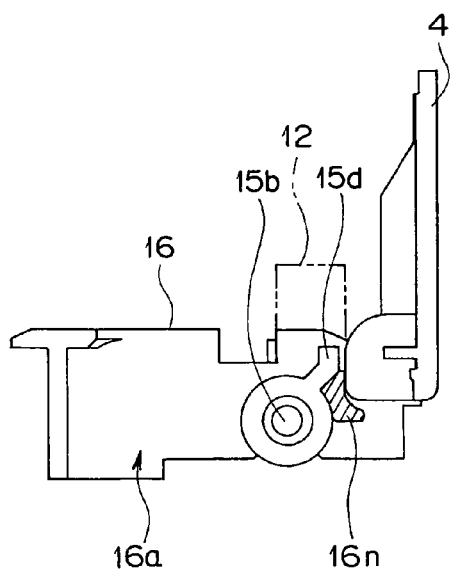
FIG. 10A is a diagram showing relative positions of a lid, a stopper for stopping a connector in a position in which connection terminals of the connector face upward, and an open-position setting unit.
Figure 10B:
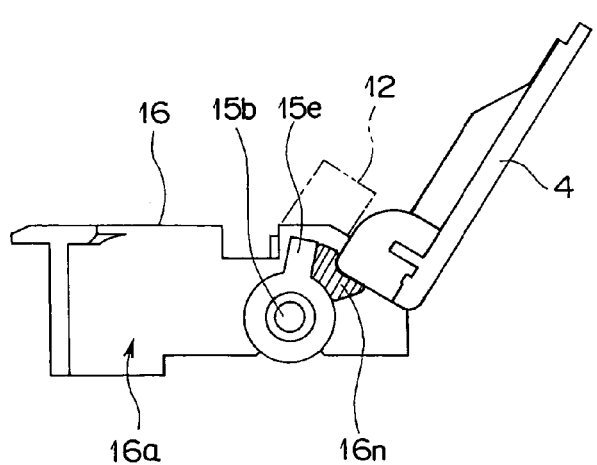
Figure 9:
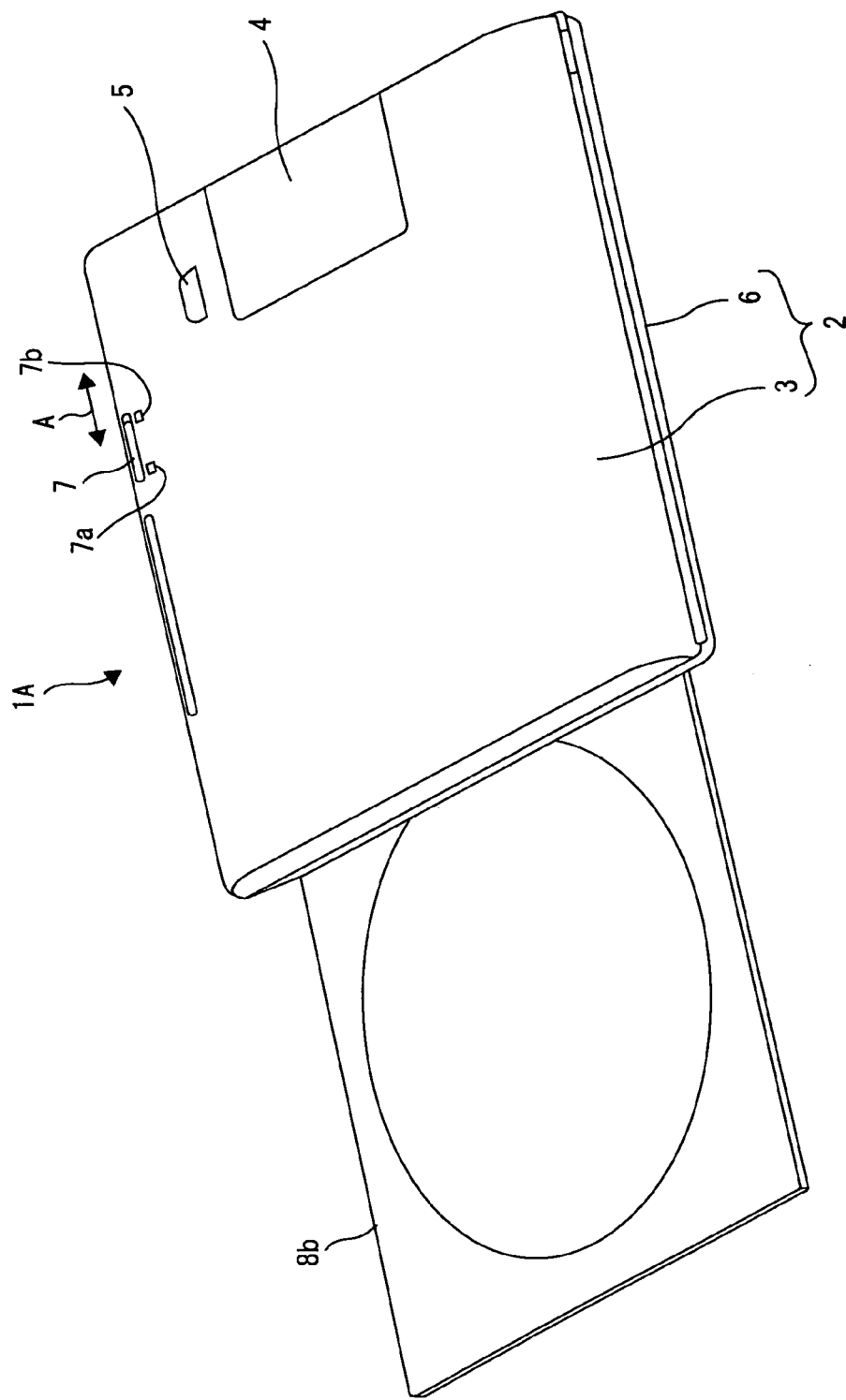

That is, as shown in FIG. 10A, a stopper 16*m* with a particular form may be disposed on each of the left-hand side part and the right-hand side part in the inner space 16*a* of the connector installation frame 16, and open-position setting units 15*d* with a particular form may be disposed at proper locations on the rotating support part 15*b* of the second holding part 15 such that the open-position setting units 15*d* are in contact with the respective stoppers 16*m*. In this structure, when the open-position setting units 15*d* come into contact with the corresponding stoppers 16*m* formed in the particular shape, the lid 4 moves into an open position and the connection terminals of the main part 11 of the connector and the lid 4 face upward. Thus, in this structure having the stoppers 16*n* and the open-position setting units 15*e* formed as shown in FIG. 10B, when the open-position setting units 15*e* come into contact with the corresponding stoppers 16*n*, it is possible to arbitrarily adjust the open position of the connection terminals of the main part 11 of the connector and the open position of the lid 4 in the state in which they rotate further in an upward direction, in other words, they rotate by an angle greater than 90°. To this end, it is necessary to properly set the number of teeth of each gear of the gear train of the gear transmission mechanism.

Although in the present embodiment, the gear transmission mechanism having the gear train is used as the power transmission mechanism, the power transmission mechanism is not limited to the gear transmission mechanism, but other types of power transmission mechanisms may be used. For example, a belt transmission mechanism including pulleys and a belt extending between the pulleys, or a mechanical transmission mechanism using friction gears or cams may be used in place of gears.

Figure 11:
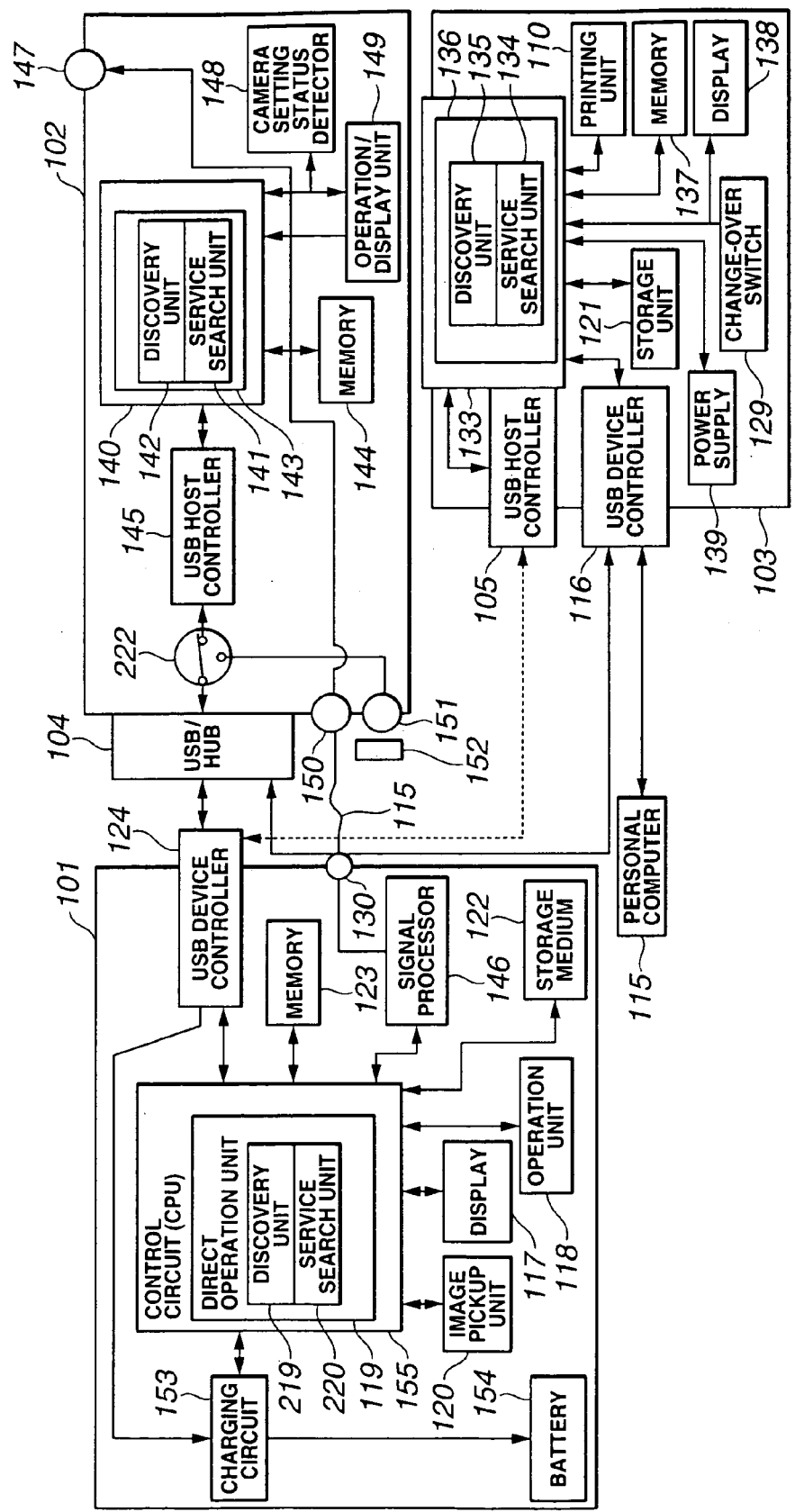
Figure 28A:
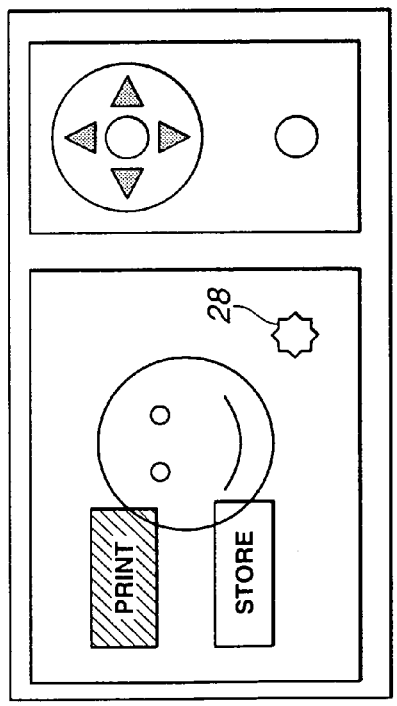
FIG. 28A shows an example of a manner in which information associated with a detected service supported by an information processing apparatus via the docking station is displayed on a display of the electronic camera.
Figure 28B:
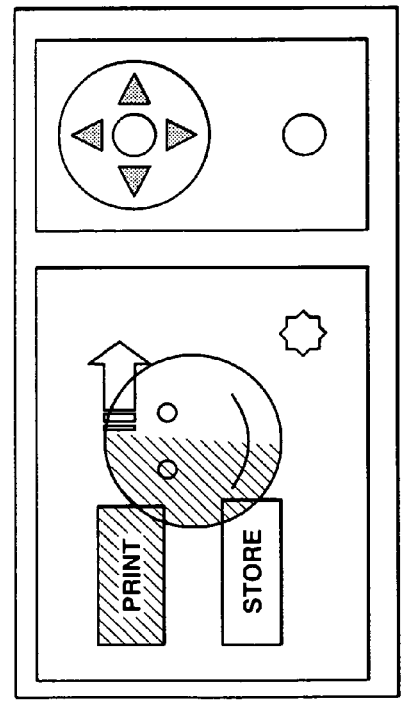
FIG. 28B shows an example of a manner in which information is displayed on a display of the electronic camera when a particular period of time has elapsed since a "Print" button is pressed via a touch panel.
Figure 28C:
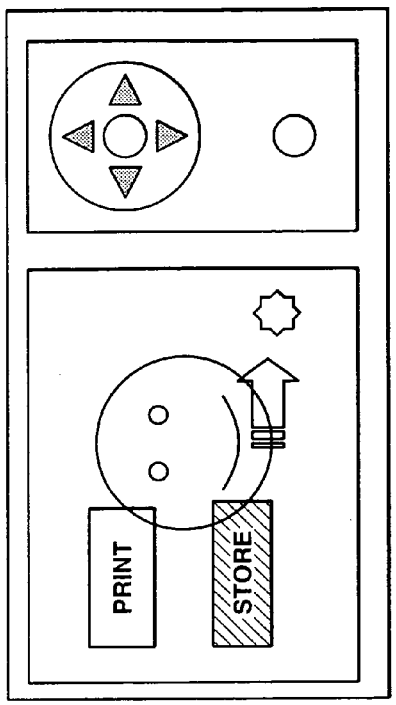
FIG. 28C shows an example of a manner in which information is displayed on a display of the electronic camera when a particular period of time has elapsed since a "Store" button is pressed via a touch panel.
Figure 28D:
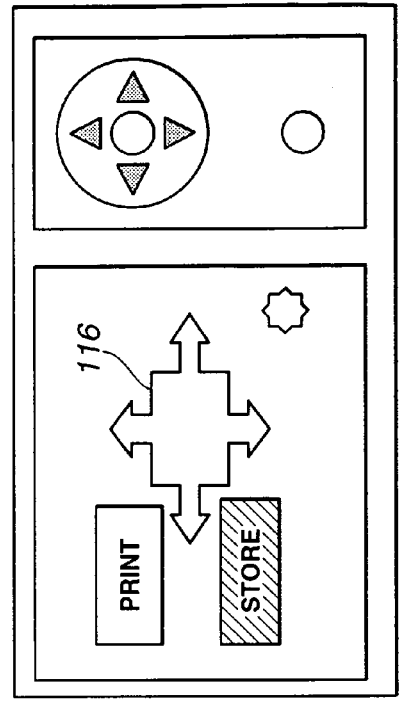

Referring to FIGS. 11 and 28D, an information processing system including a portable information terminal device cradle apparatus is described below.

In this system, by way of example, the portable information terminal device is assumed to be an electronic camera. However, the portable information terminal device is not limited to the electronic camera, but the portable information terminal device may be a PDA device capable of transmitting/receiving e-mails, a portable telephone storing data such as a telephone number table (the portable telephone may have a camera), a portable audio player capable of storing audio data, or a photo viewer capable of storing photo data together with audio data. Furthermore, although in the system according to the present embodiment, by way of example, the information processing apparatus is assumed to have a storage capability and a print capability, the information processing apparatus may have only the storage capability or the print capability.

Figure 12:
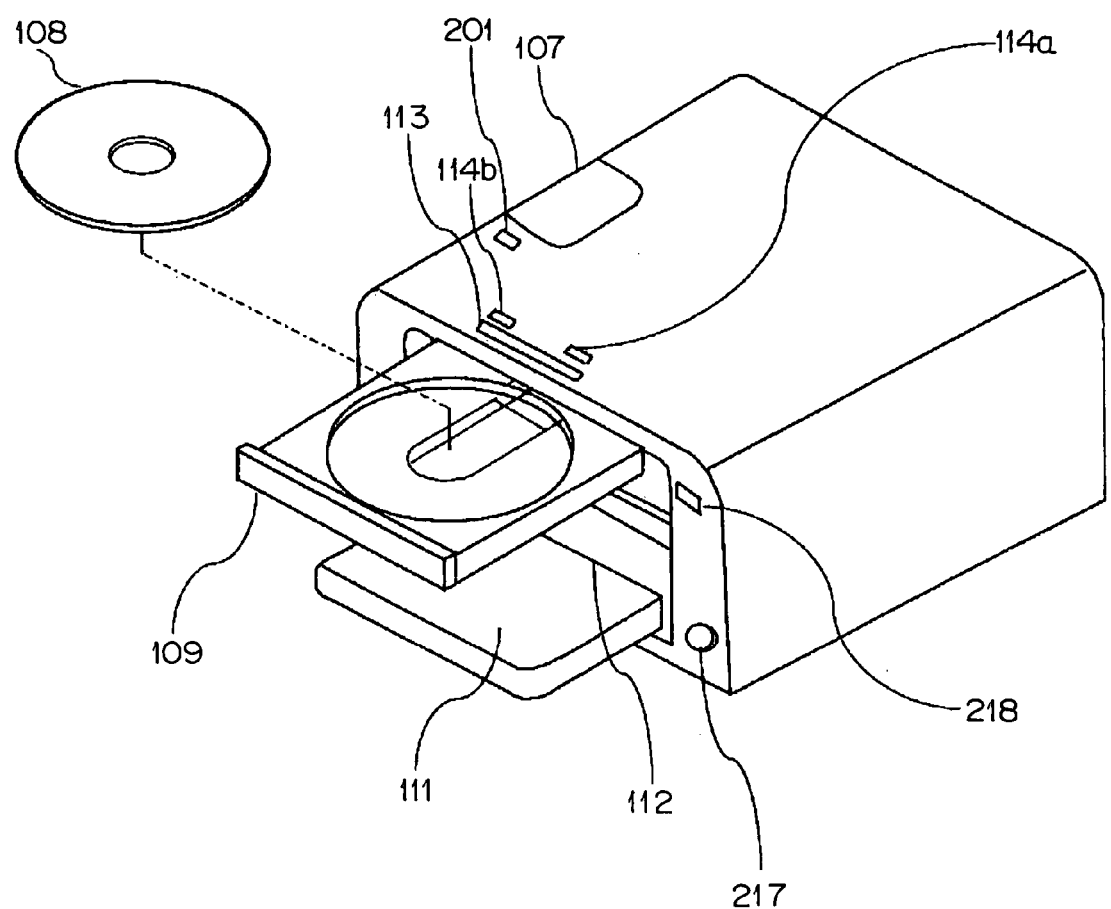
Figure 26:
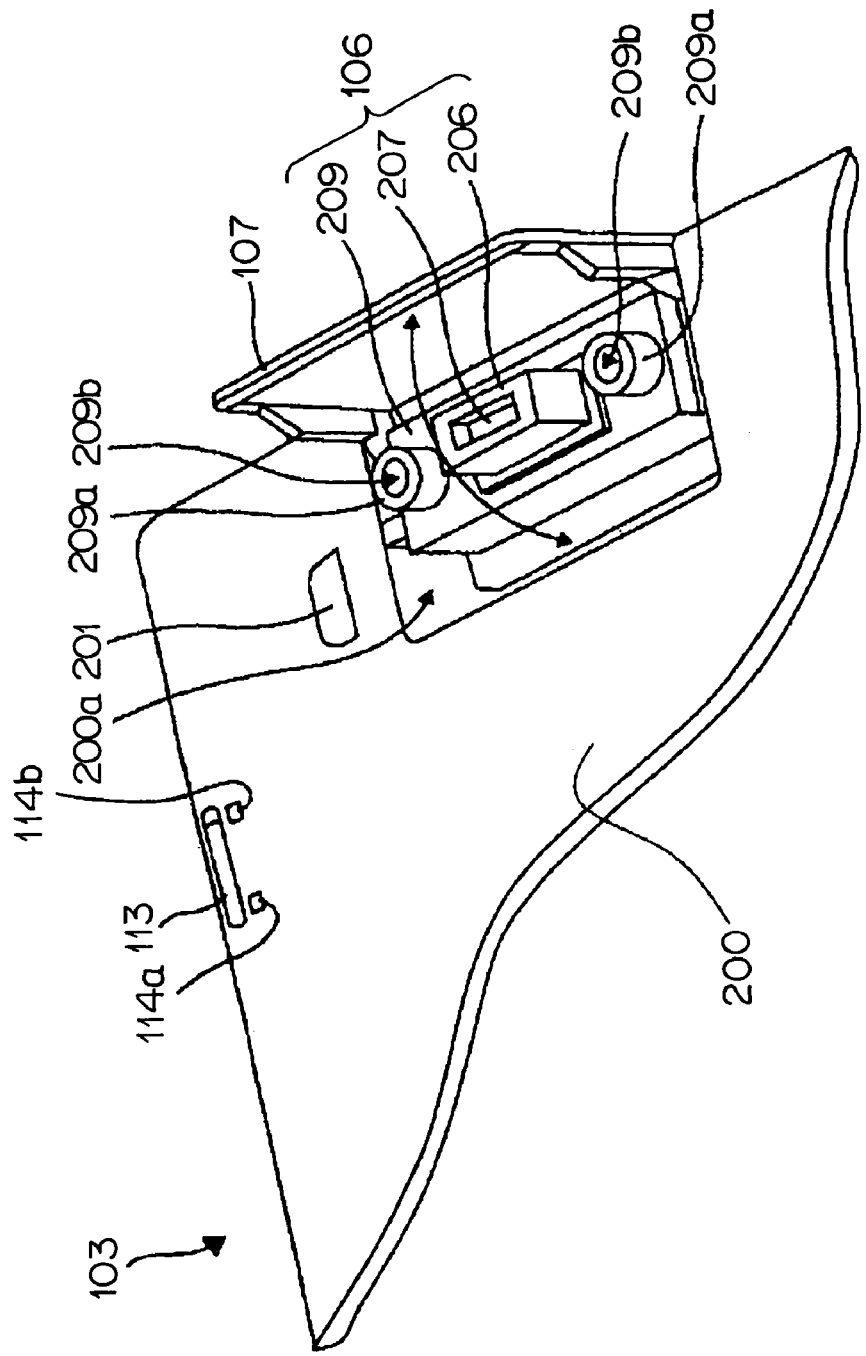

With reference to FIGS. 11, 12, and 26, the structure of the information processing system is described below.

This system includes an electronic camera 101, a docking station 102 serving as a cradle assembly, and an information processing apparatus 103. In the present embodiment, the information processing apparatus 103 is used as a portable information terminal device cradle apparatus, and the electronic camera 101 is used as a portable information terminal device. The docking station 102 has capabilities of supplying electric power to the electronic camera 101 to charge it, and displaying an image such as a still image or a motion image on a television set. The information processing apparatus 103 has capabilities of storing data and printing data.

The docking station 102 has a USB/HUB 104 for connection with the electronic camera 101, the information processing apparatus 103, and/or other devices to transmit or receive image data or control signals to or from the connected device. A USB connector 106 of a USB device controller 116, for connection with the docking station 102, is disposed on the upper surface of the information processing apparatus 103.

The USB connector 106 is capable of being housed inside the information processing apparatus 103. More specifically, the USB connector 106 is rotatably connected to connectors which mesh with the rotatable opening-and-closing lid 107 via a gear. In a case in which a disk drive 121 used as the storage unit installed in the information processing apparatus 103 is a hard disk drive (HDD), there is no particular restriction on the direction of the rotation axis about which the opening-and-closing lid 107 rotates. However, in the case of a ½-inch slim-type optical disk drive having a tray 109 for mounting an optical disk 108 such as DVD-RW, as with the disk drive 121 used in the present embodiment, the rotation axis is set to be parallel with the direction in which the tray 109 is drawn.

Although in the present embodiment, an optical disk drive is used as the disk drive 121, a magnetic disk drive may be used.

A cassette insertion slot 112 is formed in a front bezel of a printer 110 that is a printing unit disposed in the information processing apparatus 103. A cassette 111 in which a stack of printing paper is placed is inserted in the cassette insertion slot 112. A change-over switch 113 and an LED indication unit 114 including LEDs 114a and 114b are disposed on the upper surface of the information processing apparatus 103. The information processing apparatus 103 has a power switch 217 and an eject button 218 for ejecting a tray 109 disposed on a front panel having the cassette insertion slot 112. In a state in which the electronic camera 101 is directly connected to the information processing apparatus 103 via the docking station 102, there is a parallel positional relationship among the direction in which the cassette 111 is inserted in the printer unit 110, the front surface (or the back surface) of the electronic camera 101 attached to the docking station 102, and the rotation axis about which the opening-and-closing lid 107 of the information processing apparatus 103 rotates, as will be described in further detail later. In this structure, when the cassette insertion slot 112 of the printer unit 110 and the door of the tray 109 of the built-in slim-type disk drive of the information processing apparatus 103 are formed in the right-hand side face, a user can easily handle the cassette and the tray.

When the information processing apparatus 103 includes the printer unit 110 and a disk drive unit 121, a printed circuit board 8a of the disk drive unit 121 may be formed so as to serve as a heat radiating plate, or a metal plate may be bonded to the printed circuit board 8a such that the metal plate serves as a heat radiating plate. This makes it unnecessary to use the lower plate 6 shown in FIG. 3 when the disk drive unit 121 and the printer unit 110 are combined in an integral form. A partition plate (not shown) may be provided to prevent heat created by the printer unit 110 from being transferred to the disk drive unit 121.

The structures of a PC 115 and the information processing apparatus 103 including the printer unit 110 and the disk drive unit 121 and the connection between the PC 115 and the information processing apparatus 103 are described below.

The information processing apparatus 103 has transmitting/receiving means (not shown) for converting data into a specified form to transmit or receive the data to or from the PC 115 by wires or wirelessly. The transmitting/receiving means is connected to the USB connector 106 of the USB device controller 116 connectable to a USB interface or the like.

The PC 115 includes a display for displaying information such as image information and/or text information, an input unit, and a CPU (controller). The PC 115 performs a control process in accordance with information input via the input unit by a user. Under the control of the CPU, the PC 115 turns on/off LEDs. The PC 115 also includes a hard disk device for storing attribute information and connection information such as an address necessary in communication with a communication device on a network. The CPU is connected to various parts and peripheral circuits via a bus such that the CPU can control these parts and peripheral circuits. The PC 115 further includes memories such as a ROM in which a program by which the CPU operates and a RAM used as a work area of the CPU.

Main parts of the electronic camera 101 and the functions thereof are described.

A user can control the operation of the docking station 102 and the printer unit 110 or the disk drive unit 121 of the information processing apparatus 103 by issuing a command via the electronic camera 101 based on information displayed on a display 117 of the electronic camera 101. More specifically, in the case of the electronic camera 101 having an operation control unit 118 including a switch directly used by a user to input an operation command to the electronic camera 101, the electronic camera 101 is capable of directly controlling the operation of the printer unit 110 or the disk drive unit 121 of the information processing apparatus 103. In this case, a direct operation control unit 119 including a discovery unit 219 and a service search unit 220 performs transferring and handling of data associated with available service between the electronic camera 101 and the information processing apparatus 103.

An image pickup unit 120 captures an image of a subject, generates an image signal of the captured image, and generates image data by performing various kinds of image processing. A display 117 displays information indicating services performable in conjunction with the disk drive unit 121 or the printer unit 110 of the information processing apparatus 103, information indicating that a service is completed, or image data. A storage medium 122, such as a memory card, with a high storage capacity is used to store image data generated by the image pickup unit 120. A memory 123 is used to store a virtual file generated for each service supported by the electronic camera 101, file information associated with virtual files or the like transmitted from the information processing apparatus 103, and information for controlling operations of various parts of the electronic camera 101.

The electronic camera 101 also has a USB device controller 124 that is an interface according to the USB standard. The USB device controller 124 allows data communication with the docking station 102 connected via the USB/HUB 104 and also the printer unit 110 or the disk drive unit 121 of the information processing apparatus 103 connected to the USB/HUB 104 via a USB connector.

Although not shown in the figures, also in the case in which the information processing apparatus 103 has only the storing capability or the printing capability, when an opening-and-closing lid rotatably formed in an upper surface of the printer or the disk drive is moved into an open position, a rotatable connector holding part to which a USB connector and a pair positioning guide pins are attached is exposed in an opening formed in the upper plate. The rotation shaft of the opening-and-closing lid and the rotation shaft of the connector holding unit are connected to each other via a gear.

Instead of connecting the electronic camera 101 to the information processing apparatus 103 via the docking station 102, the electronic camera 101 may be directly connected to the information processing apparatus 103. By sharing pins used as a control terminal, a DC power supply terminal, a video signal terminal, a ground terminal, etc. provided in the USB connector of the USB host controller 105 disposed in the upper surface of the information processing apparatus 103, it is possible to easily connect the electronic camera 101 to the information processing apparatus 103 without using a cable.

When a connector (such as a second connecting part 221 shown in FIG. 19D or a first connecting part 177 shown in FIG. 19B, which will be described later) disposed on the main part of the electronic camera 101 is connected to the USB connector 106 disposed on the upper surface of the printer, the docking station 102 serves merely as a device through which electrical signals simply passes. Therefore, in the state in which the USB connector 106 disposed on the upper surface of the printer is connected to the connector of the docking station 102, the electronic camera 101 may be directly connected to the docking station 102 via connectors. In this case, the optical disk drive is not installed in the docking station 102.

Figure 13:
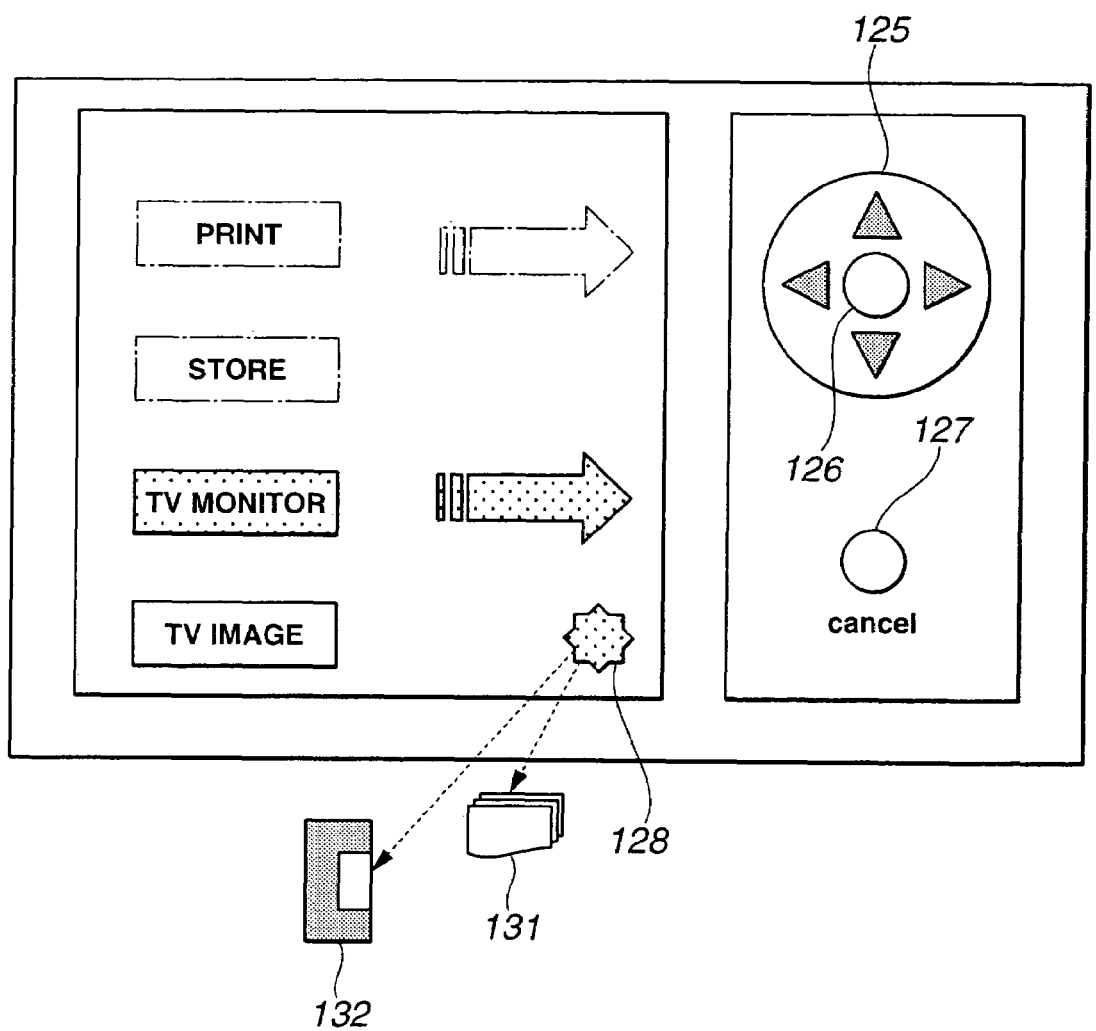

Referring to FIG. 13, an LCD (Liquid Crystal Display) used as the display 117 disposed on the back surface of the electronic camera 101 and keys disposed on the operation control unit 118 are described below.

As shown in FIG. 13, a selection key 125 for selecting an image displayed on the display 117 is disposed on the back surface of the electronic camera 101. An OK key 126 for fixing the selection is disposed at the center of the selection key 125. A cancel key 127 for canceling the selection fixed by the OK button 126 is disposed in an area below the selection key 125.

The display 117 displays information associated with camera functions depending on the image shooting mode or the reproduction mode. Furthermore, when the print service or the storage service is detected as available service in the state in which the electronic camera 101 is connected to the information processing apparatus 103 via the docking station 102, characters such as "Print" or "Store" are displayed on the display 117 together with an icon (hereinafter, this icon will be referred to as a first icon) 128 indicating that the electronic camera 101 is connected to the docking station 102.

On the front of the display screen of the display 117, a pressure-sensitive touch panel formed of a thin resistive film with a transparent sheet is disposed, and characters such as "Print" and "Store" are displayed, in addition to images, on the display 117. The display 117 may be formed using two liquid crystal displays: a first liquid crystal display for displaying images; and a second liquid crystal display having a touch panel and being also capable of displaying images. In this configuration, characters such as "Print" and "Store" are displayed on the second liquid crystal display having the touch panel of the resistive type or the electrostatic type.

For example, when a user selects a text area where "Print" is displayed on the display 117 by pressing it, the first icon 128 disappears and an arrow icon is displayed in a faded-in fashion to the right of the text "Print" to indicate that printing is being performed. When the printing is successfully completed, the arrow icon disappears in a faded-out fashion, and the first icon 128 is displayed again. On the other hand, in the case in which a user selects a text area where "Store" is displayed by pressing it, the first icon 128 disappears and an arrow icon is displayed in a faded-in fashion to the right of the text "Store" to indicate that storing is being performed. When the copying is successfully completed, the arrow icon disappears in a faded-out fashion, and the first icon 128 is displayed again.

When an operation/display unit 149 of the docking station 102 is turned off by operating a change-over switch unit 129 of the information processing apparatus 103, an icon (hereinafter, this icon will be referred to as a second icon) 131 indicating that the docking station 102 is currently connected to an information processing apparatus is not displayed in the state in which the PC 115 is connected to the docking station 102.

When the electronic camera 101 is directly connected to the information processing apparatus 103 without passing through the docking station 102, the second icon 131 is displayed on the display 117. When the electronic camera 101 is directly connected to the PC 115 without passing through the docking station 102, a "Connected to PC" icon (hereinafter, referred to as a third icon) 132 is displayed on the display 117. When battery charging is being performed or when the electronic camera 101 is connected to the PC 115 via the docking station 102, the first icon 128 is displayed.

When services associated with TV (television) and the docking station are detected, characters "TV monitor" and "TV image" are displayed together with the first icon 128 on the display 117. In the case in which the display 117 is formed using two liquid crystal displays, that is, the first liquid crystal display for displaying images, and the second liquid crystal display having the touch panel and being also capable of displaying images, text information such as "TV monitor" and "TV image" is displayed on the second liquid crystal display having the touch panel of the resistive type or the electrostatic type. "TV image" referred to here is to display image data stored on a DVD recorder on a TV screen. "TV image" may be replaced with "Card copy" for transferring image data stored on the DVD recorder to a memory card attached to the portable information terminal device such as the electronic camera 101.

When a user selects the text area "TV monitor" by pressing it, the first icon 128 disappears, an arrow icon is displayed in a faded-in fashion to the right of the text area "TV monitor" to indicate that TV monitoring is started. After the arrow icon is displayed for a particular period, this arrow icon disappears in a faded-out fashion. When the cancel key 127 is pressed during the TV monitoring, the first icon 128 is displayed again.

Main parts of the information processing apparatus 103 and the docking station 102 are described below.

First, the information processing apparatus 103 is described.

In the information processing apparatus 103, a control circuit (hereinafter, referred to as a CPU) 133 is responsible for control over the information processing apparatus 103 and has a direct operation unit 136 including a service search unit 134 and a discovery unit 135. The service search unit 134 searches for services available between the information processing apparatus 103 and the electronic camera 101 connected to the information processing apparatus 103. The discovery unit 135 determines whether the electronic camera 101 connected to the information processing apparatus 103 is of a type that can be directly operated. The direct operation unit 136 performs transferring and handling of data associated with services available between the electronic camera 101 and the information processing apparatus 103.

A memory 137 is used to store a produced virtual file corresponding to print service or storage service supported by the information processing apparatus 103 and also used to store information for controlling various parts of the information processing apparatus 103. The printer unit 110 prints an image in accordance with image data. The disk drive unit 121 stores image data. The USB host controller 105 serves as an interface according to the USB standard, for data communication with the electronic camera 101 connected with the information processing apparatus 103. A display 138 displays various kinds of information on LEDS depending on the switching position of the change-over switch unit 129. A power supply 139 supplies electric power to various parts of the information processing apparatus 103.

Figure 14:
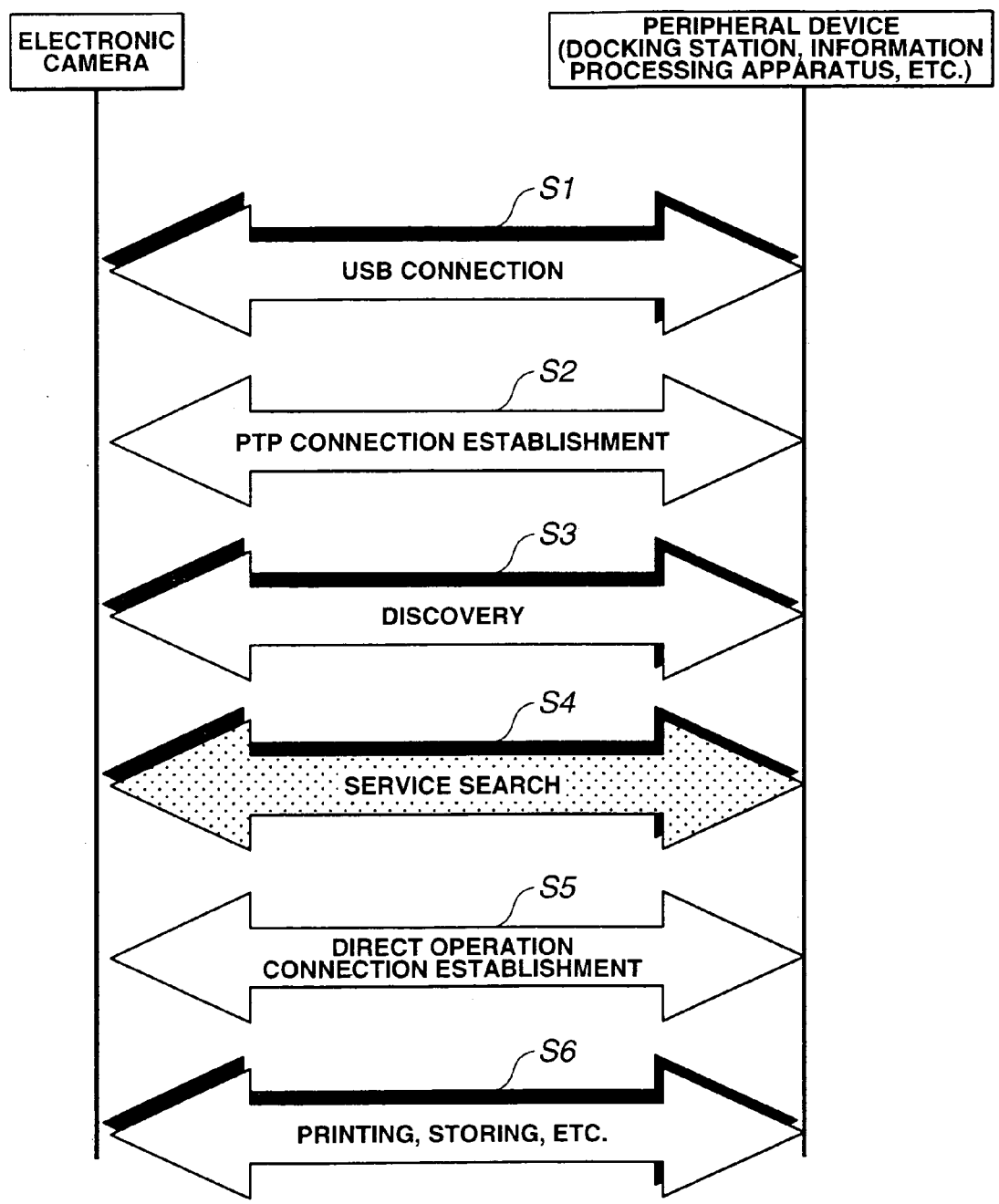

FIG. 14 is a flow chart of transferring and handling of data associated with services performed between the electronic camera 101 and a peripheral device such as the docking station 102 or the information processing apparatus 103. As shown in FIG. 14, when the electronic camera 101 is connected to the peripheral device via a USB interface, in step S1, a negotiation is performed to determine whether the electronic camera 101 and the peripheral device are capable of performing PTP (Picture Transfer Protocol) communication. If both devices have the PTP communication capability, a PTP connection is established in step S2.

Thereafter, in step S3, a negotiation is performed between discovery units to determine whether both the electronic camera 101 and the peripheral device are of the direct operation type. If it is determined that both the electronic camera 101 and the peripheral device are of the direct operation type, then in step S4 service searching is performed. If a service that is allowed to be performed between the electronic camera 101 and the peripheral device is detected in the service searching, then in step S5, a direct operation connection is established. When the direct operation connection has been established, it becomes possible to perform the service such as printing or storing between the electronic camera 101 and the peripheral device in step S6.

Although in the flow chart shown in FIG. 14, the discovery and the service search are performed separately in steps S3 and S4, they may be performed in a single step.

FIG. 15 shows an example of a processing flow performed after a service performable between the electronic camera 101 and the peripheral device is detected in the flow shown in FIG. 14. In the flow shown in FIG. 15, in particularly, details of the service searching in step S4 are described.

In FIG. 15, steps S1 to S3 are performed in a similar manner as described above.

In the following step S4, service searching is performed as follows. First, in step S4a, a request signal for the number of file identifiers is transmitted from the peripheral device to the electronic camera 101. When the electronic camera 101 receives this request signal, in step S4b, the electronic camera 101 produces a virtual file for each service supported by the electronic camera 101 and stores the produced virtual file in the memory 123.

In the present embodiment, if the electronic camera 101 supports one or more of print service, storage service, and docking station service, the electronic camera 101 produces one virtual file corresponding to the one service supported by the electronic camera 101 or produces a plurality of virtual files corresponding to the respective services supported by the electronic camera 101, and the resultant one or more virtual files are stored in the memory 123. The one or more virtual files may be empty files with a file size of 0. There is no restriction on the timing of producing the one or more virtual files, as long as the one or more virtual files are produced before the following step S4c is started.

When the one or more virtual files are produced and stored in the memory 123, then in step S4c, in response to the request for the number of file identifiers received in step S4a, data indicating the number of file identifiers assigned to the respective files stored in the memory 123 is transmitted from the electronic camera 101 to the peripheral device.

Subsequently, in step S4d, the peripheral device transmits a signal for requesting a file identifier list to the electronic camera 101. In response, in step S4e, the electronic camera 101 transmits the list of the file identifiers to the peripheral device.

Subsequently, in steps S4f, S4g, and S4h, the peripheral device searches for services performable between the peripheral device and the electronic camera 101 by examining the respective virtual files whether they correspond to services supported by the peripheral device, based on the file identifier list acquired in step S4e.

In the present embodiment, in the case in which the service supported by the peripheral device is print service, that is, in the case in which the peripheral device is a printer, virtual files corresponding to the print service are searched for. On the other hand, in the case in which the service supported by the peripheral device is storage service, that is, in the case in which the peripheral device is a storage device, virtual files corresponding to the storage service are searched for. In the case in which print service and storage service are supported by the peripheral device, that is, in the case in which the peripheral device is the information processing apparatus 103, virtual files corresponding to the print service and virtual files corresponding to the storage service are searched for. In the case in which the service supported by the peripheral device is docking station service, that is, in the case in which the peripheral device is the docking station 102, virtual files corresponding to the docking station service are searched for.

The searching for virtual files is performed as follows. That is, in step S4f, a signal for requesting file information associated with a file corresponding to a file identifier is transmitted in step S4g from the peripheral device to the electronic camera 101 for each file identifier described in the acquired file identifier list. In step S4h, in response to the request signal, file information including a file name is transmitted from the electronic camera 101 to the peripheral device. The above steps are performed repeatedly as many times as there are file identifiers acquired in step S4c. Via these steps, file information including the same file names as those of the virtual files corresponding to services supported by the peripheral device is detected.

In the present embodiment, file information is searched for in the above-described manner thereby searching for virtual files corresponding to services supported by the peripheral device.

In the virtual file searching process, when file information including the same file name as that of a virtual file corresponding to a service supported by the peripheral device is detected, then, in step S4i, the peripheral device determines that the service corresponding to the file (virtual file) associated with the detected file information is a service to be performed between the peripheral device and the electronic camera 101.

When services performable between the peripheral device and the electronic camera 101 are detected in the above-described manner, then in step S4k, a virtual file is produced for each service supported by the peripheral device and stored in a memory of the peripheral device, such as the memory 137 of the information processing apparatus 103.

In the present embodiment, in the case in which the service supported by the peripheral device is print service, that is, in the case in which the peripheral device is a printer, a virtual file corresponding to the printer service is produced and stored in a memory of the printer. On the other hand, in the case in which the service supported by the peripheral device is storage service, that is, in the case in which the peripheral device is a storage device, a virtual file corresponding to the storage service is produced and stored in a memory of the storage device. In the case in which print service and storage service are supported by the peripheral device, that is, in the case in which the peripheral device is the information processing apparatus 103, a virtual file corresponding to the print service and a virtual file corresponding to the storage service are produced and stored in a memory of the information processing apparatus 103. In the case in which the service supported by the peripheral device is docking station service, that is, in the case in which the peripheral device is the docking station 102, a virtual file corresponding to the docking station service is produced and stored in a memory of the docking station 102. The virtual files may be empty files with a file size of 0. There is no restriction on the timing of producing the one or more virtual files, as long as the one or more virtual files are produced before the following step S4l is started.

When the one or more virtual files are produced and stored in the memory, then in step S4l, file information including the file names of the virtual files is transmitted from the peripheral device to the electronic camera 101. In step S4m, a response signal to the file information transmitted from the peripheral device is transmitted from the electronic camera 101 to the peripheral device. When the electronic camera 101 receives the file information of the virtual file from the peripheral device, the electronic camera 101 temporarily stores the received file information in the memory 123. In step S4n, the electronic camera 101 detects the service supported by the peripheral device based on the file information including the file name and displays the detected service on the display 117. For example, in the case in which the docking station service is detected, the first icon 128 is displayed. When the electronic camera 101 receives file information associated with a virtual file corresponding to a docking station service, the electronic camera 101 determines that the electronic camera 101 is connected to the docking station 102 and the first icon 128 may be displayed.

The manner in which the process of searching for available services and transferring and handling data associated with the services is performed has been described above. The details of the process are disclosed in Japanese Patent Application No. 2003-357294 filed by the present applicant.

As described above, when the docking station 102 functions as a USB host device and the electronic camera 101 and the information processing apparatus 103 function as USB devices, operations such as storing (copying) or printing of image data can be controlled by a user by operating the electronic camera 101 to issue a command and transmit the command by using the communication protocol PTP.

Now, the docking station 102 is described below.

In the docking station 102, a control circuit (hereinafter, referred to as a CPU) 140 is responsible for control over the docking station 102 and has a direct operation unit 143 including a service search unit 141 and a discovery unit 142. The service search unit 141 searches for services performable between the docking station 102 and the electronic camera 101 connected to the docking station 102. The discovery unit 142 determines whether the electronic camera 101 connected to the docking station 102 is of a type that can be directly operated. The direct operation unit 143 performs transferring and handling of data associated with services performable in conjunction with the electronic camera 101 connected to the docking station 102.

A memory 144 is used to store a produced virtual file corresponding to a docking station service supported by the docking station 102 and also used to store information for controlling various parts of the docking station 102. A USB host controller 145 serves as an interface according to the USB standard, for data communication with the electronic camera 101 connected to the USB/HUB 104. A USB change-over switch 222 is used to select a device connected to the USB/HUB 104 from the USB host controller 145 and a PC terminal 151. For example, in the case in which the electronic camera 101 and the information processing apparatus 103 are connected to the docking station 102, at the point of time when the information processing apparatus 103 is connected to the docking station 102, the PC terminal 151 is covered by a shielding plate 152 and, in synchronization with this (or in synchronization with the connection of the information processing apparatus 103 to the docking station 102), the USB change-over switch 222 switches the connection such that the USB host controller 145 is connected to the USB/HUB 104 so as to make it possible to perform USB communication between the electronic camera 101 and the docking station 102. In the case in which the electronic camera 101 and, for example, the PC 115 are connected to the docking station 102, the PC terminal 151 is not covered by the shielding plate 152 because the information processing apparatus 103 is not connected. The non-connection of the information processing apparatus 103 causes the USB change-over switch 222 to switch the connection such that the USB/HUB 104 is connected to the PC terminal 151 thereby making it possible to perform USB communication among the electronic camera 101, the docking station 102, and the PC 115.

The docking station 102 also has a first TV terminal 147, a camera setting status detector 148, an operation/display unit 149, a second TV terminal 150, an AC power terminal, and a charging circuit.

The memory 144 is not only used to store virtual files described above but may also be used to temporarily store image data transmitted from the electronic camera 101. In general, if image data (image signal) captured by the electronic camera 101 is stored not in a compressed form but in a non-compressed form, it becomes possible to print the image data with higher image quality. However, storing the image data in the non-compressed form needs a very large storage capacity, and thus the storage medium 122 can store only a small number of image data. To avoid the problem with the storage capacity of the storage medium 122, the image data temporarily stored in the memory 144 of the docking station 102 may be transferred to the information processing apparatus 103 or to an external printer for printing the image data via the PC 115 connected to the PC terminal 151. The docking station 102 may include a network interface that allows data communication with a device via an external network. This makes it possible to transmit image data to a printer directly connected to the external network or indirectly connected to the external network via a server or the like and print the image data using such the printer.

A card reading/writing operation performed under the control the CPU 140 of the docking station 102 is described below.

In order to make it possible to store image data output from a TV set, the service search unit 141 may search for a service performable in conjunction with the electronic camera 101 connected to the TV set. In this case, the electronic camera 101 is placed on the docking station 102 such that the liquid crystal display screen of the display 117 of the electronic camera 101 faces toward a user. In this state, it is possible to store image data output from the TV set connected to the docking station 102 in the storage medium 122 such as a memory card attached to the electronic camera 101 or it is possible to reproduce image data stored in the storage medium on the TV set. In this case, the operation is controlled not by the docking station 102 but by a signal processor 146 of the electronic camera 101. That is, the signal processor 146 of the electronic camera 101 is directly connected to the second TV terminal 150 without passing through the USB host controller 145. The signal processor 146 is an NTSC converter or a PAL converter.

An input/output terminal 130 connected to the signal processor 146 is connected via a dedicated cable 115 to the second TV terminal 150 connected to the first TV terminal 147. The connector for the connection to the electronic camera 101 may include connection terminals associated with the USB/HUB 104, connection terminals associated with the second TV terminal 150, and a connection terminal for detecting whether the docking station 102 is connected to the electronic camera 101 when virtual files are not used. These connection terminals may be united and formed as a single connector, a dedicated connector. Image data and audio data can be stored on the storage medium 122. It is also possible to display image data and audio data stored on the storage medium 122 on the TV monitor via the signal processor 146 of the electronic camera 101. The operation of displaying the image data stored on the storage medium 122 of the electronic camera 101 on the TV monitor and the operation of storing the image data output from the TV set on the storage medium 122 are controlled in accordance with a command issued by a user via the electronic camera 101.

The operation of charging a battery performed under the control of the CPU 140 of the docking station 102 is described below.

The CPU 140 determines whether the electronic camera 101 is placed on the docking station 102 based on an output signal from the camera setting status detector 148. Then, the CPU 140 turns on an LED on the operation/display unit 149 to indicate that the electronic camera 101 is connected to the docking station 102. More specifically, the LED is lit continuously or in a blinking fashion, or a blue LED or a red LED is lit to indicate whether or not the electronic camera 101 is connected to the docking station 102. Electro power is supplied to a battery 154 from the AC power terminal of the docking station 102 via a charging circuit, a DC power terminal of the USB connector, the USB device controller 124 of the electronic camera 101, and a charging circuit 153. The charging operation is started in response to a command issued by a control circuit (CPU) 155 of the electronic camera 101. More specifically, the CPU 155 determines whether image data is displayed by the LCD controller in accordance with a program stored in the electronic camera 101 or determines whether the electronic camera 101 is connected to the docking station 102 and receives a signal transmitted from the CPU 140, and the CPU 155 of the electronic camera 101 controls the charging circuit 153 to charge the battery 154 when the electric power of the electronic camera 101 is in the on or off state.

Referring to FIGS. 16A to 19C, the camera setting status detector 148 for detecting the camera setting status and the operation/display unit 149 are described below.

First, referring to FIGS. 16A to 18B, the external appearance of the electronic camera 101 is described. The electronic camera 101 described below has functions similar to those described earlier with reference to FIG. 13, but there is some difference in the external appearance. The electronic camera 101 has a mechanical switch (not shown) for detecting whether the display 117 is in a closed position. When the display 117 is in the closed position, the mechanical switch terminal disposed on a main part 156 of the camera is pressed by the frame of the display 117, and the mechanical switch is turned on. The fact that the mechanical switch is in the on state is detected by the CPU 155 in the electronic camera 101.

FIGS. 16A, 16B, and 16C illustrate the state in which the display 117 of the electronic camera 101 is in the closed position. A left-hand part, with a horizontal length equal to about ⅓ of the total horizontal length of the main part 156 of the electronic camera 101, serves as a gripping part 157. A self-timer indicator window 158 is formed in an upper area of the gripping part 157. A right-hand portion of the front surface of the main part 156 of the camera, with a horizontal length equal to about two thirds of the total horizontal length of the main part 156, is covered by the display 117 that is closed with its back surface exposed to the outside. An indication light transmission window 159 is formed in an upper area of the display 117 such that a user can view, through the window 159, indicators that are lit continuously or in a blinking fashion depending on the status of the camera. A double hinge 160 is disposed in a lower area of the display 117. On the surface, on which a lens (not shown) is disposed, of the main part 156 of the cameras, a step part 156a is formed on a side end of the main part 156.

On the upper side of the camera, a zoom lever 161 and a shutter button 162 are disposed at locations above the self-timer indicator window 158. A remote control receiving photosensor 163 is disposed to the right of the shutter button 162.

The electronic camera 101 also has a camera connection part 164 disposed in the center of the height of the electronic camera 101, that is, at a height one-half the total height h of the electronic camera 101 such that the camera connection part 164 is located at the same height regardless of whether the electronic camera 101 is placed upside up or upside down.

As shown in FIGS. 17A, 17B, and 17C, the display 117 of the electronic camera 101 can be turned downward as viewed in FIG. 17A or 17B about the double hinge 160 into an open position. In this open position, the display screen 117a of the display 117 faces forward. A power switch button 168 is disposed in the lower right corner (as viewed in FIG. 17A) of the display screen 117a of the display 117. When the display 117 is turned toward the open position, a shooting lens window 165 formed in the center of the front surface of the main part 156 of the camera appears behind the display 117, and a stroboscope window 166 and a microphone 167 appears in the upper right corner. The microphone 167 is located below the stroboscope window 166.

When the display 117 is in the closed position as shown in FIG. 16A and when the display 117 is in the open position as shown in FIG. 17A, light is emitted outward from the indication light transmission window 159. That is, light is emitted forward and backward from the indication light transmission window 159.

When the electronic camera 101 with the display 117 in the open position is used to shoot an image of a scene including a user himself/herself, the user can view the display screen 117a of the display 117 to monitor the image. The electronic camera 101 has a mechanical switch (now shown) to detect whether the display 117 is in the open position. When the display 117 is in the open position, the mechanical switch terminal disposed on the main part 156 of the camera is released from the frame of the display 117, and the mechanical switch is brought into an off-state, which is detected by the CPU 155 of the electronic camera 101.

Figure 18A:
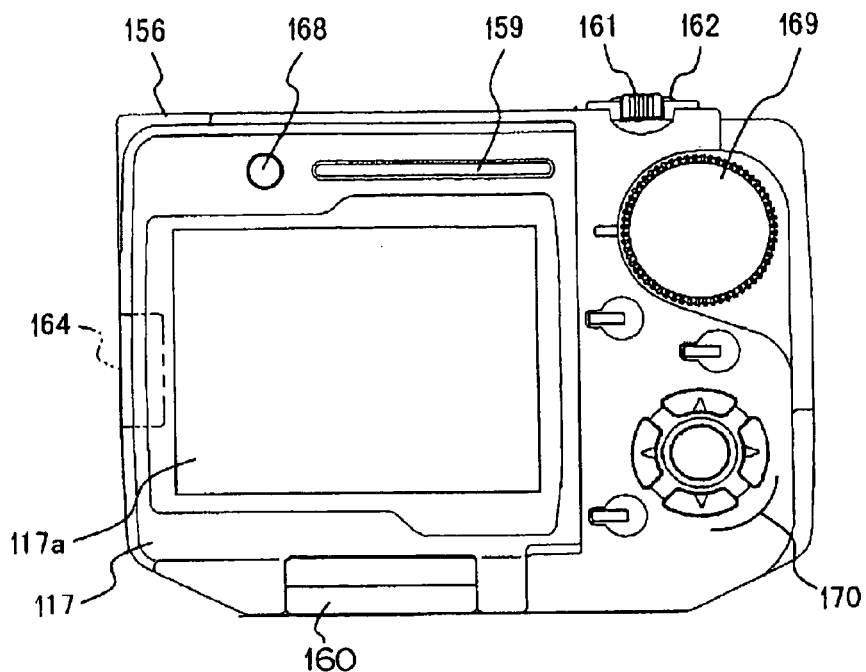
FIG. 18A shows a state in which the display is further turned from a flat open position into a position in which the back surface of the display comes into contact with the back surface of a main part of the camera.

As shown in FIG. 18A, when the electronic camera 101 is used, the display 117 can be further turned from the flat open position described above into a position in which the display screen 117a comes into contact with the back surface of the camera. In this state, about ⅔ of the back surface is covered by the display 117. In a remaining area of the back surface exposed without being hidden by the display 117, a mode dial 169, four arrow keys 170, and other operation buttons are disposed such that when the display 117 is in the position in contact with the back surface of the electronic camera 101, various operations can be performed while viewing information displayed on the display screen 117a.

Figure 18B:
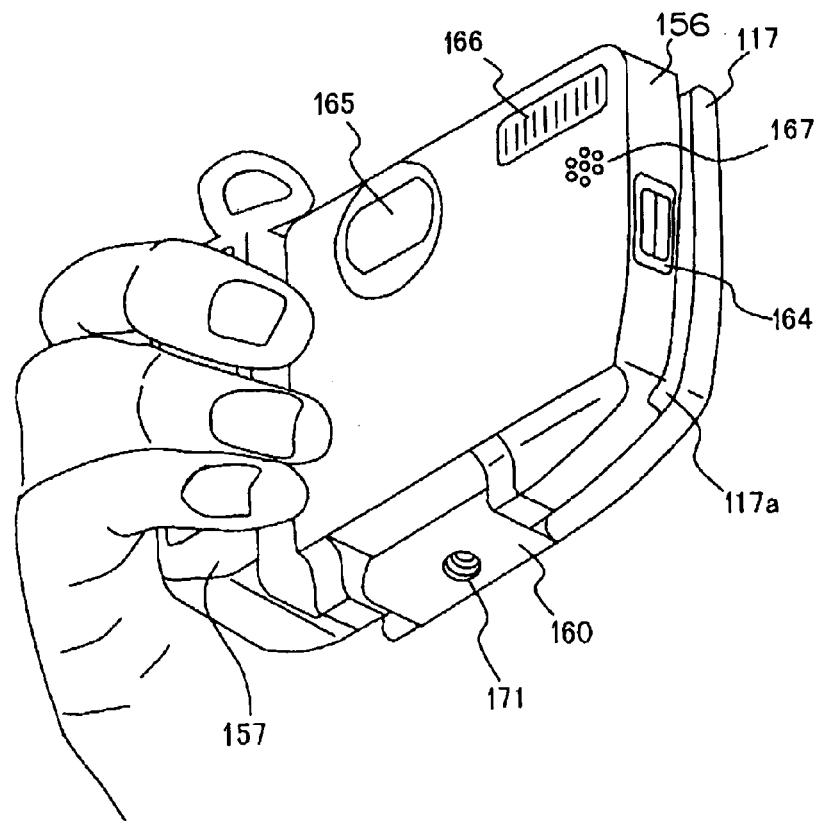
FIG. 18B is a diagram showing a manner in which the electronic camera is used in the state shown in FIG. 18A.

As shown in FIG. 18B, during an image shooting operation, a user can hold the electronic camera 101 by gripping the gripping part 157 with fingers and can press the shutter button 162 while monitoring an image displayed on the display screen 117a. A tripod screw hole 171 is formed in the back surface of the double hinge 160 such that when the display 117 is turned from the closed position shown in FIG. 16A into the position in contact with the back surface of the camera, the tripod screw hole 171 appears on the bottom side of the camera thereby allowing a tripod screw to be connected into the tripod screw hole 171. This makes it possible to use the tripod when an image is shot using the electronic camera 101 in the state shown in FIGS. 18A and 18B.

Now, referring to FIGS. 19A to 19D, the external appearance of the docking station 102 is described.

As shown in FIGS. 19A to 19D, the docking station 102 includes a main part 172 and a housing part 173. The housing part 173 includes a camera placing plate 174 on which to place the electronic camera 101 and side walls 175. The side walls 175 extend upward from the respective opposite side ends of the camera placing plate 174. The side walls 175 serve to position the electronic camera 101 placed on the camera placing plate 174 and protect the upper and bottom side faces of the electronic camera 101.

The main part 172 has a flat plate 172a forming a rear side wall of the housing part 173. In the center of the flat plate 172a, a circular rod-shaped rotating part 176 is disposed such that a rotation surface 176a is substantially flush with the surface of the flat plate 172a.

One end face of the rotating part 176 serves as the rotation surface 176a. The rotating part 176 is disposed on the main part 172 such that in the state in which the electronic camera 101 is placed in the housing part 173, the rotation surface 176a comes to a position facing the camera connection part 164 and such that the peripheral surface of the circular rod-shaped rotating part 176 serves as an operation part and the peripheral surface is partially exposed via the upper surface of the main part 172.

The rotating part 176 has a first connecting part 177 protruding from the rotation surface 176a, for an electrical connection with the camera connection part 164 of the electronic camera 101. The first connecting part 177 is a connector of the USB/HUB 104 including at least a terminal for supplying electric power to the electronic camera 101. In the present embodiment, the connecting part 177 further includes a USB output terminal and a video input terminal.

The first connecting part 177 is disposed at a location shifted by a particular distance in a radial direction from the rotation center of the rotation surface 176a of the rotating part 176 such that it becomes possible to handle the change in the position of the camera connection part 164 of the electronic camera 101 placed in the housing part 173, which occurs depending on whether the electronic camera 101 is placed upside up or upside down in the housing part 173. That is, the position of the first connecting part 177 can be switched by a user by rotating the rotating part 176 between two positions shown in FIG. 19B and 19C.

The rotating part 176 also has a plate-shaped connection prevention part 178 disposed on the rotation surface 176a. The connection prevention part 178 is formed close to the first connecting part 177 such that it protrudes outward further beyond the end of the first connecting part 177. This causes the first connecting part 177 to be prevented from being connected to the camera connection part 164 when the first connecting part 177 is at a location that does not corresponds to the location of the camera connection part 164, as will be described in further detail later. In this sense, the connection prevention part 178 also serves as a positioning part.

In FIGS. 19A to 19D and FIGS. 20A to 20D, the shape of the connection prevention part 178 and the shape of the rotating part 176 are illustrated in a simplified fashion. However, actually, the connection prevention part 178 has a cutout as shown in FIG. 21A or 21B, and the rotating part 176 has an inner wall and steep balls are embedded at intervals of 180° on the peripheral surface.

As shown in FIG. 19D, the docking station 102 has the second connecting part 221 facing downward on the bottom and back surface of the docking station 102. The second connecting part 221 is for making a direct electrical connection with a connector of another device without passing through an external cable. For example, the second connecting part 221 is connected with the connector 207 of the information processing apparatus 103. On both sides in the longitudinal direction of the second connecting part 221, a pair of protrusions are formed which correspond to a pair of screw fitting holes 209b formed on one side face of a first holding part 209 of the information processing apparatus 103 as shown in FIG. 26, which will be described later. Therefore, when the second connecting part 221 is connected to the connector 207 of the information processing apparatus 103, the pair of protrusions comes into holes of the pair of positioning protrusions 209a, thereby positioning the second connecting part 221 with respect to the connector 207 of the information processing apparatus 103.

Referring to FIGS. 20A to 20D, two methods of attaching the electronic camera 101 to the docking station 102 are described.

Figure 20A:
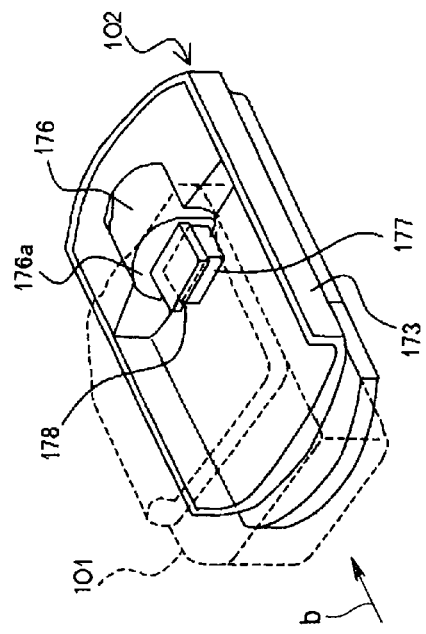
FIG. 20A shows the electronic camera laid from the state shown in FIG. 18A or 18B into a position in which the display of the electronic camera faces upward.
Figure 20B:
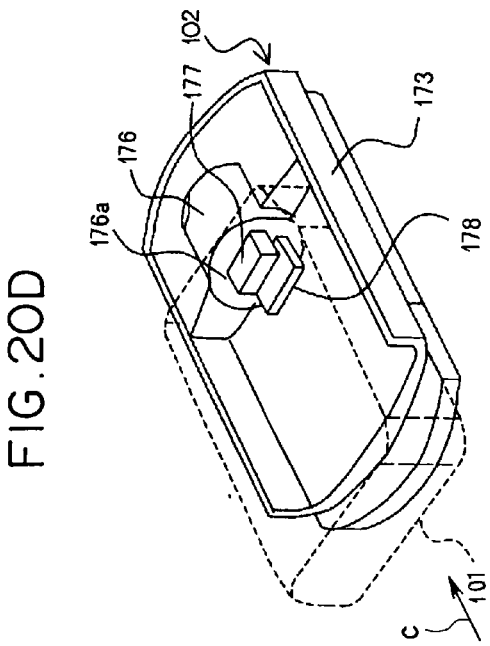
FIG. 20B shows a state in which the rotating part of the docking station is turned such that the first connecting part and the connection prevention part come to positions shown in FIG. 19B.

First, referring to FIGS. 20A and 20B, a first attaching method is described.

As shown in FIG. 20A, first, the electronic camera 101 is laid such that the display screen 117a of the display 117 faces upward. The rotating part 176 of the docking station 102 is rotated such that the first connecting part 177 and the connection prevention part 178 come to relative positions shown in FIG. 19B. In this state, the electronic camera 101 is placed in the housing part 173 of the docking station 102 by moving the electronic camera 101 in a direction indicated by an arrow b in FIG. 20B such that the electronic camera 101 is attached to the docking station 102 as represented by dotted lines in FIG. 20B. When the electronic camera 101 is attached in the above-described manner, the end of the connection prevention part 178 comes into a space of the step part 156a of the main part 156 of the camera and thus the first connecting part 177 is connected to the camera connection part 164.

When the electronic camera 101 is attached upside down to the docking station 102 as described above, the battery of the electronic camera 101 is charged by a DC power supply via a DC power connector (not shown). Even in this state, a user is allowed to operate the mode dial 169, the four arrow keys 170, or other operation buttons while viewing information displayed on the display screen 117a of the display 117.

Now, the other attaching method is described with reference to FIGS. 20C and 20D.

Figure 20C:
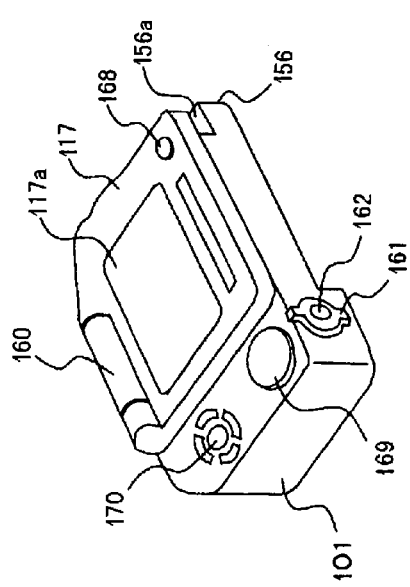
FIG. 20C shows the electronic camera laid from the state shown in FIG. 16A, 16B, or 16C into a position in which the front surface of the electronic camera faces upward.

As shown in FIG. 20C, first, the electronic camera 101 is laid such that the front surface of the electronic camera 101 faces upward. The rotating part 176 of the docking station 102 is rotated such that the first connecting part 177 and the connection prevention part 178 come to relative positions shown in FIG. 19C. In this state, the electronic camera 101 is placed in the housing part 173 of the docking station 102 by moving the electronic camera 101 in a direction indicated by an arrow c in FIG. 20D such that the electronic camera 101 is attached to the docking station 102 as represented by dotted lines in FIG. 20D. Also in this case, when the electronic camera 101 is attached in the above-described manner, the end of the connection prevention part 178 comes into a space of the step part 156a of the main part 156 of the camera and thus the first connecting part 177 is connected to the camera connection part 164.

As described above, regardless of whether the electronic camera 101 is placed upside up or upside down in the housing part 173 of the docking station 102, that is, regardless of whether the electronic camera 101 is placed in the position shown in FIG. 16B or in a turned-over position, the camera connection part 164 is maintained at the same height with respect to the electronic camera 101. This ensures that no change occurs in terms of the relative position between the camera connection part 164 and the rotation surface 176a of the rotating part 176 disposed in the center of the flat plate 172a forming the rear wall of the housing part 173 of the docking station 102.

Thus, by rotating the rotating part 176 by 180° such that the first connecting part 177 on the rotation surface 176a comes into the position shown in FIG. 19B or the position shown in FIG. 19C depending on whether the electronic camera 101 is placed upside up or upside down, it is possible to correctly make a connection with the camera connection part 164 of the electronic camera 101.

Figure 20D:
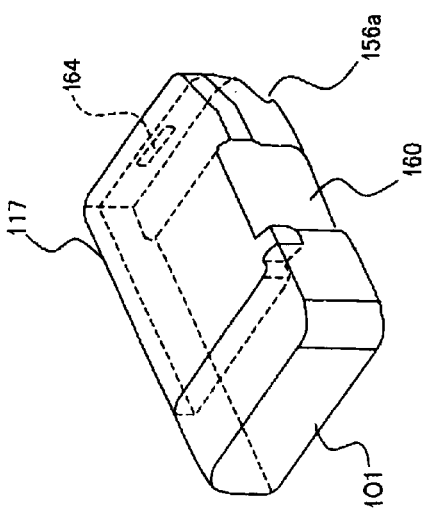
FIG. 20D shows a state in which the rotating part of the docking station is turned such that the first connecting part and the connection prevention part come to positions shown in FIG. 19C.

When the electronic camera 101 is attached to the docking station 102, there is a possibility that the relative position between the electronic camera 101 and the rotating part 176 of the docking station 102 is incorrect for connection as in the case in which the electronic camera 101 is placed in the position shown in FIG. 20A when the rotating part 176 is in the position shown in FIG. 20D or as in the case in which the electronic camera 101 is placed in the position shown in FIG. 20B when the rotating part 176 is in the position shown in FIG. 20C. When the relative position between the electronic camera 101 and the rotating part 176 of the docking station 102 is incorrect, when the electronic camera 101 is tried to be attached to the docking station 102, the connection prevention part 178 comes into contact with the side face, where the step part 156a is not formed, of the main part 156 of the camera, before the first connecting part 177 reaches the camera connection part 164, and the electronic camera 101 cannot be further moved toward the docking station 102. This prevents the first connecting part 177 from being incorrectly connected to the camera connection part 164.

When the electronic camera 101 is placed upside down on the docking station 102 and attached to the docking station 102 to charge up the battery of the electronic camera 101 from the DC power supply via the DC power connector (not shown), even if something drops on the electronic camera 101 or if something comes into contact with the electronic camera 101 during the charging of the battery of the electronic camera 101, the display screen 117a of the display 117 is not damaged. This allows it to perform charging of the battery in a highly reliable fashion, and a user is free from cares during the charging operation.

When a user attaches the electronic camera 101 upside up or upside down to the docking station 102, the camera setting status detector 148 detects whether the electronic camera 101 is placed upside up or upside down. Based on the output signal from the camera setting status detector 148, the CPU 140 controls the indication on the operation/display unit 149 to notify the user of the connection status. More specifically, LEDs (not shown) disposed on the main part 172 of the docking station 102 are turned on/off depending on whether the electronic camera 101 is placed upside up or upside down. For example, when the electronic camera 101 is placed upside up, a blue LED is lit, while a red LED is lit when the electronic camera 101 is placed upside down.

When the docking station 102 is placed on the information processing apparatus 103, the second TV terminal 150 of the docking station 102 and the PC terminal 151 that is a USB connector for connection with a PC are hidden by the shielding plate 152.

Referring to FIGS. 21A and 21B, the mechanism of detecting the connection status of the electronic camera 101 is described in further detail below.

As shown in FIGS. 21A and 21B, a spline structure is partially formed on the peripheral surface of the rotating part 176. The first connecting part 177 and the connection prevention part 178 are formed on the rotation surface 176a of the rotating part 176 such that the fist connecting part 177 is located apart by a distance of a from the rotation center of the rotating part 176, and the connection prevention part 178 is located apart by a distance of b from the rotation center of the rotating part 176. Accordingly, the first connecting part 177 and the connection prevention part 178 eccentrically rotate as the rotating part 176 rotates.

When the rotating part 176 is viewed from the right-hand side, as shown in FIG. 21B, the end part of the connection prevention part 178 extends outward by a distance d relative to the end of the connecting part 177. This causes the end of the connection prevention part 178 to reach one side face of the main part 156 of the camera before the end of the connecting part 177 reaches. This prevents terminal pins of the first connecting part 177 from being damaged.

The rotating part 176 has an inner wall in the center thereof. The connection prevention part 178 has a cutout 179 and a fitting hole 181 through which a fixing screw 180 is inserted. The length of the under-head part of the fixing screw 180 is set to be greater by, for example, 0.05 mm than the length of the fitting hole 181 formed in the rotating part 176. To prevent the fixing screw 180 from coming off a countersunk hole, the fixing screw 180 is bonded to a fixing nut 182. Steel balls 183a and 183b are partially embedded on the peripheral surface of the rotating part 176, at locations apart in angle by 180° and in the longitudinal direction (denoted by the arrow b or c in FIG. 20B or 20D) by a particular distance from each other.

On the other hand, a pair of leaf springs 184a and 184b is fixed, with small screws 185a and 185, to the main part 172 of the docking station 102, at particular locations such that the leaf springs 184a and 184b are slanted upward. Each of the leaf springs 184a and 184b has a hole in which the steel ball 183a or 183a is fitted. Mechanical microswitches 188a and 188b are disposed on the main part 172 of the docking station 102 such that the leaf springs 184 are in contact with the mechanical microswitch 188a or 188b.

Figure 22:
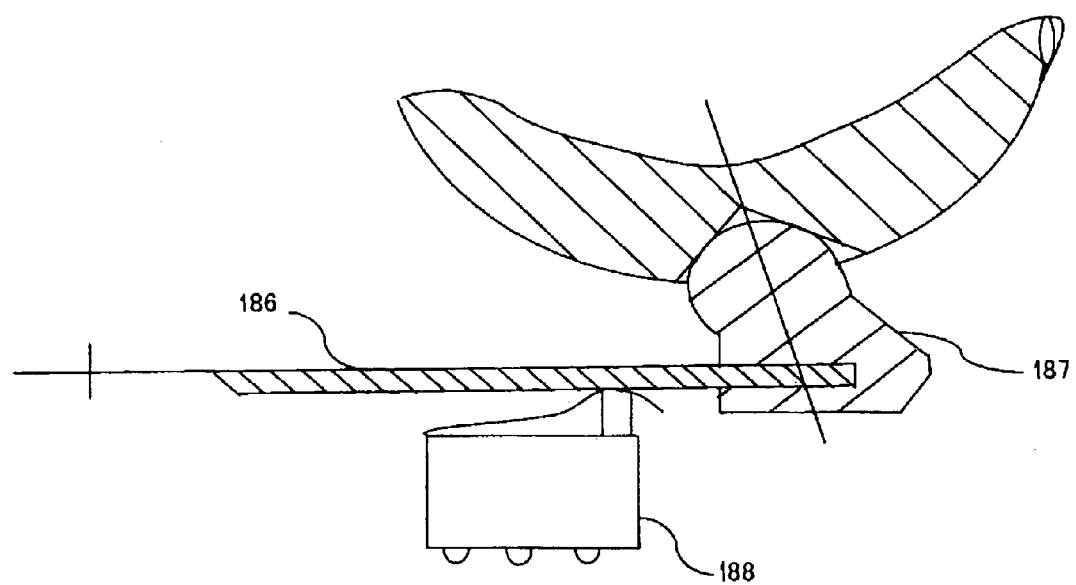

The pair of leaf springs 184a and 184b are disposed at particular locations opposing the steel balls 183a and 183b. As shown in FIG. 22, a protrusion 187 having a spherical part may be disposed on the end of each of leaf springs 186 (only one leaf spring 186a is shown in FIG. 22), and leaf springs 186 and mechanical microswitches 188 may be disposed on the main part 172 of the docking station 102 such that each leaf spring 186 is in contact with one of the mechanical microswitches 188. However, in this case, V grooves are formed, at locations apart by 1800 from each other, on the peripheral surface of the rotating part 176 (note that the V grooves are also apart from each other in a direction perpendicular to the page of FIG. 22).

The operation of the mechanism is described in further detail below.

When the rotating part 176 is rotated depending on the position in which the electronic camera 101 is placed, the steel ball 183 urged by the leaf spring 184 falls into the hole of the leaf spring 184 as shown in FIG. 21A or the spherical part of the protrusion 187 is fitted into the V groove as shown in FIG. 22. As a result, the rotating part 176 is fixed in the desired position. When the rotating part 176 comes into the fixed position, one of the microswitches 188a and 188b is pressed by the leaf spring 186 and turned on from the off-state.

That is, when the electronic camera 101 is placed upside up, the fixing status of the rotating part 176 is detected by the microswitch 188a. On the other hand, when the electronic camera 101 is placed upside down, the fixing status of the rotating part 176 is detected by the other microswitch 188b. The CPU 140 detects the output signals from the microswitches 188a and 188b, and, in accordance with the detected output signals, the CPU 140 turns on an LED with a particular color on the operation/display unit 149, to indicate the position in which the electronic camera 101 is placed. This allows a user to easily recognize which position the electronic camera 101 is placed in, even when the electronic camera 101 is placed on the docking station 102 in a dark environment.

Another mechanism of detecting the position in which the electronic camera 101 is placed is described below with reference to FIGS. 23A and 23B.

Figure 23A:
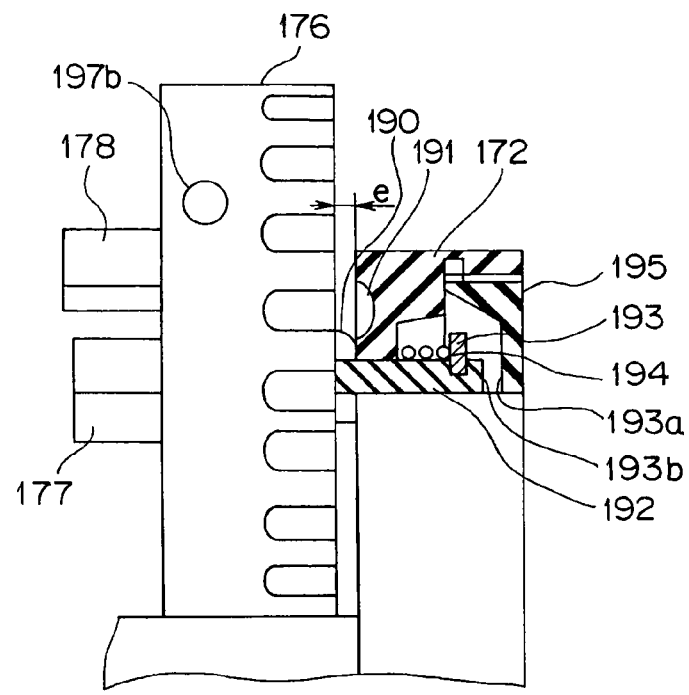
FIG. 23A is a diagram illustrating another mechanism for detection of a state in which the electronic camera is placed.
Figure 23B:
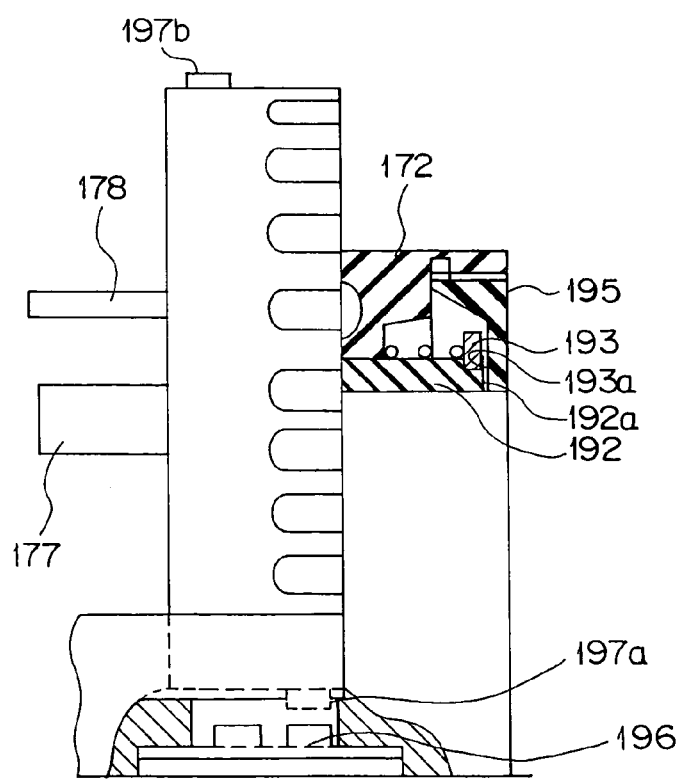
FIG. 23B is a diagram showing a state in which a permanent magnet is detected by a magnetic sensor when the permanent magnet faces to the magnetic sensor.

As shown in FIGS. 23A and 23B, the first connecting part 177 and the connection prevention part 178 are formed on the rotation surface 176a of the rotating part 176 whose peripheral surface has a spline structure, as in the previous mechanism. Steel balls are partially embedded at two locations on a rotation surface, opposite to the rotation surface 176a, of the rotating part 176.

Hemispherical recesses 191 are formed at two locations on a side face, opposing this rotation surface, of the main part 172 of the docking station 102. A shaft 192 is integrally and coaxially connected to the rotating part 176. An E ring 193 or the like is disposed on the end of the shaft 192 such that a compression spring 194 is disposed around the shaft 192 extending from the inner wall of the main part 172 of the docking station 102. Thus, in this structure, the compression spring 194 is located between the inner wall of the main part 172 and the E ring 193. The E ring 193 and the compression spring 194 are hidden behind a cover 195 screwed with the main part 172 of the docking station 102.

In this structure, when a user pulls the rotating part 176 to the left by a distance e as represented by an arrow in FIG. 23A against an urging force of the compression spring 194, the steel ball 190 goes out of the recess 191 formed on the side face of the main part 172 of the docking station 102. In this state, when the rotating part 176 is rotated, the fixing position of the rotating part 176 is switched. When the rotating part 176 comes to a new fixing position, the steel ball 190 is put into the recess 191 by the urging force of the compression spring 194. Thus, the rotating part 176 moves by a distance e and the rotating part 176 comes into contact with the main part 172. When the rotating part 176 comes into contact with the main part 172, the shaft 192 also moves by a distance e. In the above operation, the end face 192a of the shaft 192 is prevented from coming into contact with the inner surface 195a of the cover 195.

Although in this structure, the recesses 191 are formed in the hemispherical shape, the recesses 191 may be formed in the shape of a long rail groove being semi-circular in cross section and extending over an angle of 180°. A hemispherical recess with a depth greater by 0.5 mm than the depth of the rail groove may be formed at each end of the rail groove. In this structure, it is possible to rotate the rotating part 176 without needing a gap between the side face of the rotating part 176 and the end face of the main part 172 opposing the side of the rotating part 176. This makes it possible for a user to more easily rotate the rotating part 176 without causing over-rotation.

The mechanism of detecting the position is realized as follows. Through-holes are formed in the main part 172 as shown in FIG. 23B, and position a pair of magnetic sensors 196. The magnetic sensors 196 are disposed on a printed circuit board 196a. The magnetic sensors 196 detect one of permanent magnets 197a and 197b embedded at two corresponding locations on the peripheral surface of the rotating part 176. The CPU 140 detects output signals from the magnetic sensors 196 and, in accordance with the detected output signals, the CPU 140 turns on an LED with a particular color on the operation/display unit 149, to indicate the position in which the electronic camera 101 is placed. This allows a user to easily recognize which position the electronic camera 101 is placed in, even when the electronic camera 101 is placed on the docking station 102 in a dark environment.

Figure 24A:
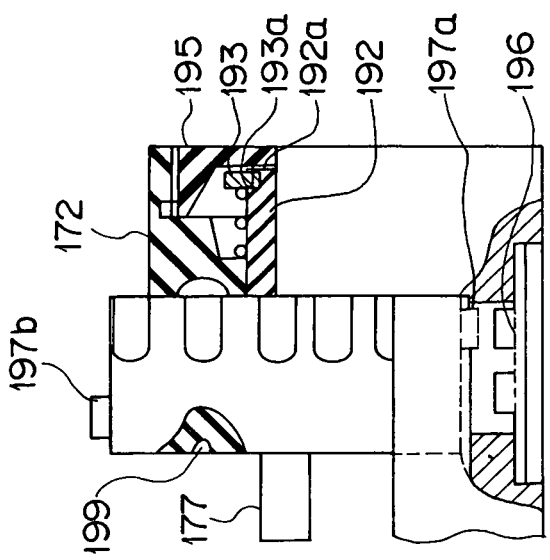
FIG. 24A is a diagram showing the electronic camera having a protrusion for detection of a state in which the electronic camera is placed.
Figure 24B:
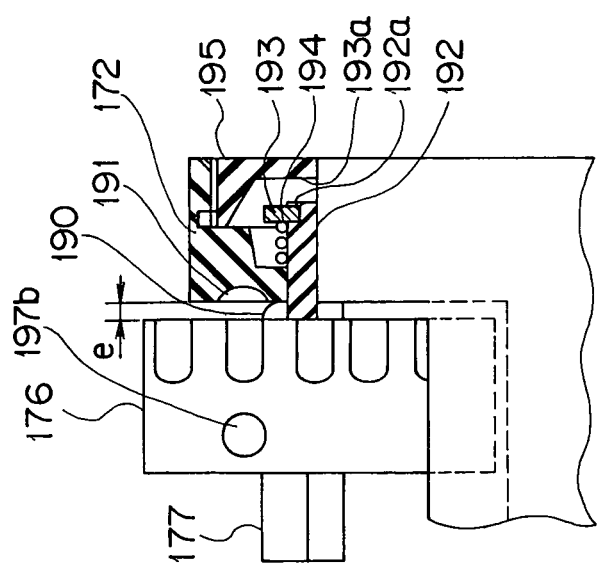
FIG. 24B is a diagram showing a connecting part of a mechanism for detection of a state in which the electronic camera is placed.
Figure 24C:
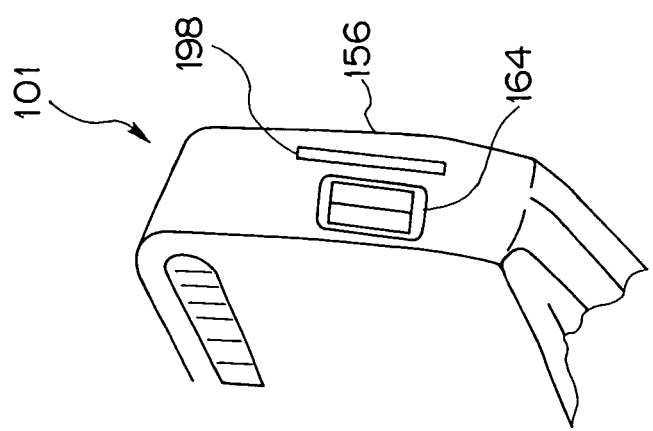
FIG. 24C is a diagram showing a state in which the electronic camera is fixed by fitting the protrusion into a recess formed on a side face of a rotating part.

Still another mechanism of detecting the position in which the electronic camera 101 is placed is described below with reference to FIGS. 24A and 24C.

In this mechanism, instead of forming the step part 156a on the electronic camera 101, a protrusion 198 is formed such that the protrusion 198 has a smaller height than that of the first connecting part 177 which is a connector of the USB/HUB 104. At a location corresponding to the protrusion 198, a recess 199 is formed in the side face, where the first connecting part 177 is disposed, of the rotating part 176 of the docking station 102. The other parts are similar to those shown in FIG. 23A or 23B, except that the connection prevention part 178 is removed.

In this structure, the electronic camera 101 is fixed by inserting the camera connection part 164 into the first connecting part 177 in the state in which the rotating part 176 is locked, until the protrusion 198 of the main part 156 of the camera is fitted in the recess 199 formed on the side face of the rotating part 176.

Now, an example of a switching operation of the docking station 102 performed when the electronic camera 101 is attached to the docking station 102 is described below.

Figure 25:
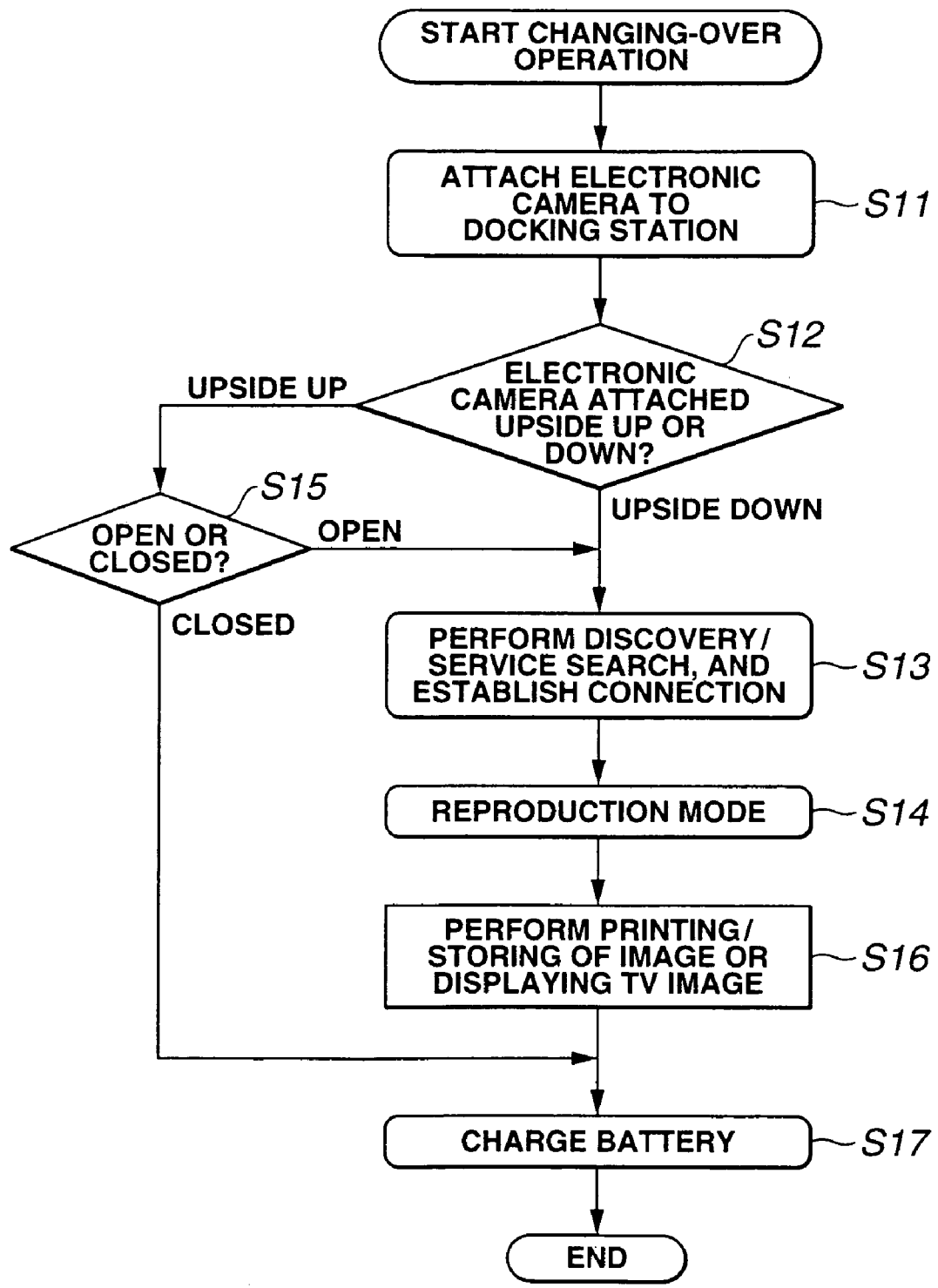

In step S11 in FIG. 25, the electronic camera 101 is attached to the docking station 102. The camera setting status detector 148 described above detects the position in which the electronic camera 101 is placed. In step S12, it is determined whether the electronic camera 101 is placed upside up as shown in FIG. 20D or upside down as shown in FIG. 20B.

When the electronic camera 101 is placed upside up, the image shooting lens is hidden behind the display 117 as shown in FIG. 20D, but step S12 can reveal whether the electronic camera 101 is placed upside up or upside down. In a case in which the electronic camera 101 is of a common type in which a display is disposed on the back surface of the main body of the electronic camera, if it is determined in step S12 that the electronic camera 101 is placed upside up, then the process proceeds to step S15 and further to step S17 in which charging of a battery is performed.

When the electronic camera 101 is attached to the docking station 102, a connection between the docking station 102 and the electronic camera 101 is established in step S13 in which discovering and searching for services are performed in a similar manner as described earlier with reference to FIGS. 14 and 15. In the discovery/service search process, virtual files corresponding to services supported by the information processing apparatus 103 or the electronic camera 101 and data indicating the number of virtual files may be stored in advance in the memory 144 of the docking station 102 or in an SDAM (Synchronous Dynamic Random Access Memory) of the electronic camera 101, or may be downloaded from the PC 115.

When the determination is made in step S12 and further the connection is established in step S13, the operation in the reproduction mode is started in step S14. In step S16, an image is displayed on the TV display screen. In the case the information processing apparatus 3 is connected to the docking station 102, which is not shown in the flow chart, image data is printed or stored. In step S17, charging of the battery is performed. After step S17, the process is ended.

In a case in which an AV terminal is not connected to the display 117 of the electronic camera 101, it is not allowed to select "TV monitor" shown in FIG. 13 in the operation in the reproduction mode. On the other hand, when the AV terminal is connected, the menu screen shown in FIG. 13 is displayed. When the "TV monitor" is selected by a user via a remote controller, for example, nine thumbnail images which are newest in terms of shooting date are displayed on the display 117. An analog signal is transmitted from the signal processor 46 of the electronic camera 101 to the TV display via the AV connector, and the thumbnail images are also displayed on the TV display screen. When the user selects one of thumbnail images which may be still images with or without data indicating the shooting dates, groups, or titles, the multi-thumbnail image is replaced with the selected image. Instead of displaying a plurality of thumbnail images on the display 117 of the electronic camera 101 or on the TV display screen, only one image may be displayed. When the "Print" button is pressed, a specified image is automatically printed. When the "Store" button is pressed, all image data stored in the memory card attached to the electronic camera 101 is transferred to a DVD storage disk. In this case, image data may be stored in an overwriting fashion.

However, if it is determined in step S12 that the electronic camera 101 is placed upside up, and it is further determined in step S15 that the display 117 of the electronic camera 101 is in the open position, the process proceeds to step S14 via step S13, and the operation in the reproduction mode is started. In the case in which it is determined in step S15 that the display 117 is in the closed position, image data stored in the electronic camera 101 is automatically transferred to the disk drive 121 of the information processing apparatus 103 only when the information processing apparatus 103 is connected to the docking station 102.

Figure 27:
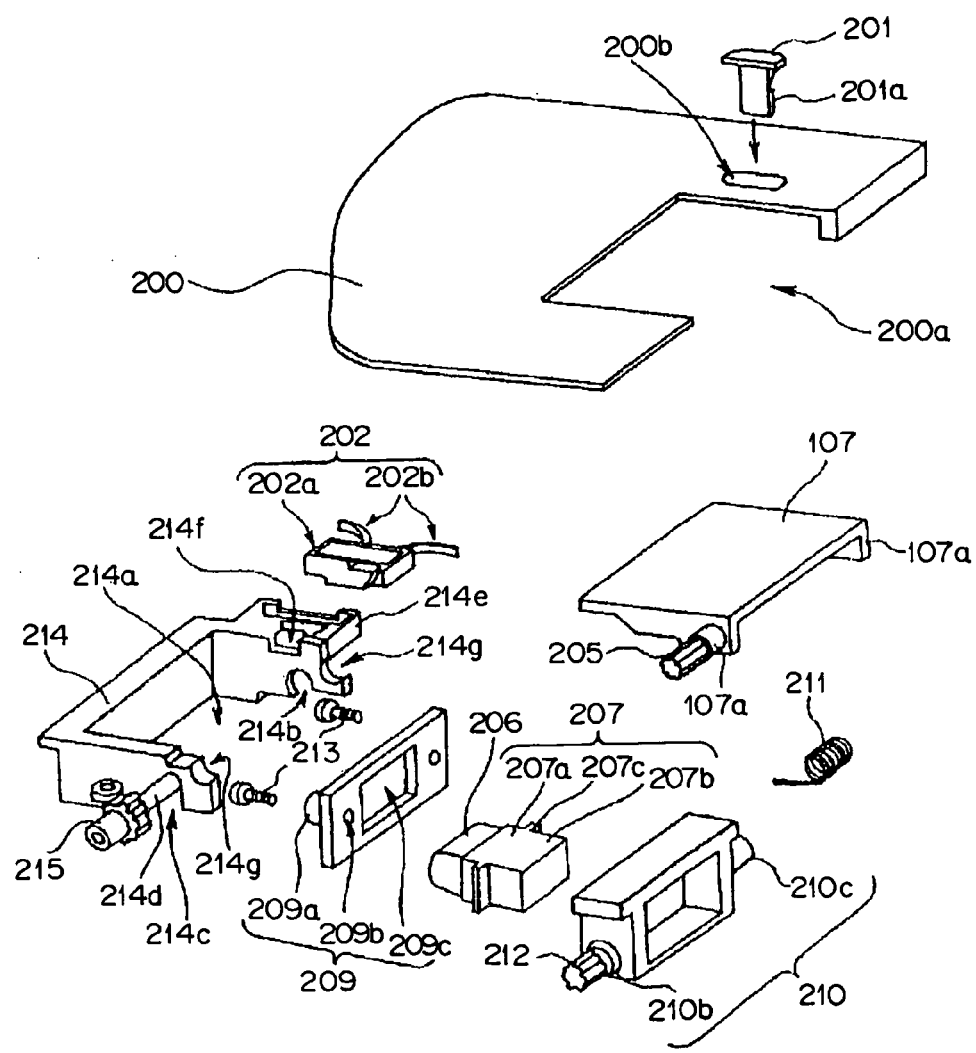

Now, referring to FIGS. 26 and 27, the opening-and-closing lid 107 disposed on the upper plate of the information processing apparatus 103, and the USB connector 106 of the USB device controller 116 are described.

As shown in FIG. 26 or 27, an opening 200a and a through-hole 200b are formed in an upper plate 200 of the information processing apparatus 103. The opening 200a is closed with the opening-and-closing lid 107. A switching terminal 201 is disposed in the through-hole 200b. The switch terminal 201 has a T-like shape and has an operation part 201a. The operation part 201a slides a connection terminal 202 (described later) in a predetermined direction against an urging force of the connection terminal 202.

The opening-and-closing lid 107 is formed such that the opening 200a is closed with the opening-and-closing lid 107 without substantially any gap therebetween. The opening-and-closing lid 107 has protrusions 107a serving as holding parts (described later) formed on two respective side ends of the opening-and-closing lid 107. On one protrusion 107a, a lid gear 205 having a particular number of teeth is formed in an integrated fashion.

In the center of a main part 207 of the connector having a protective cover 206, a flange 207c is formed such that the main part 207 of the connector is divided by the flange 207c into a front-end part 207a and a base-end part 207b.

A first holding part 209 is formed of a hard resin material with a flat plate shape. In a substantially central area of the first holding part 209, a rectangular hole 209c is formed in which the protective cover 206 is slidably disposed. A pair of positioning protrusions 209a is formed on one side face of the first holding part 209.

A second holding part 210 is formed of a hard resin material. A cylindrical-shaped rotating support part 210b is disposed on each of two sides of the second holding part 210. A protrusion 210c, around which a helical torsion spring 211 for providing an urging force is disposed, is formed on an end of one rotating support part 210b. On the other rotating support part 210b, a connector gear 212 having a particular number of teeth is formed in an integral form. The second holding part 210 also has an internal thread (not shown) formed at a location corresponding to the location of a screw insertion hole 209b, and a recess (not shown) in which the flange 207c is disposed.

The front-end part 207a of the main part 207 of the connector is inserted into the rectangular hole 209c of the first holding part 209, and the base-end part 207b of the main part 207 of the connector is held by the second holding part 210. In this state, fixing screws 213 are inserted through the respective screw fitting holes 209b of the first holding part 209, and the fixing screws 213 are screwed with the internal threads formed in the second holding part 210 such that the main part 207 of the connector is held between the first holding part 209 and the second holding part 210 and thus a complete connector 106 is obtained.

The connector installation frame 214 is formed in a rigid U-like shape using a solid resin material. The connector 106 is installed in an inner space 214a of the connector installation frame 214. The connector installation frame 214 has a pair of first supporting notches 214b and 214c in which rotating support parts 210b disposed on the second holding part 210 of the connector 106 are rotatably disposed. In the first supporting notch 214c, the shaft of the connector gear 212 is rotatably disposed.

A shaft 214d is disposed on one side face, at a location close to the first supporting notch 214c, of the connector installation frame 214, and a connection terminal installation unit 214e is disposed on the opposite side face of the connector installation frame 214. The connection terminal installation unit 214e has a hole 214f. A transmission gear 215 with a particular number of teeth is disposed on the shaft 214d such that it is rotatable together with the shaft 214d. A frame 202a, which will be described in further detail later, of the connection terminal 202 slidable by the switch terminal 201 is disposed on the connection terminal installation unit 214e.

The connector installation frame 214 also has a pair of second supporting notches 214g. The protrusions 107a of the opening-and-closing lid 107 are rotatably disposed in the pair of the second supporting notches 214g.

The connection terminal 202 has the frame 202a and an urging part 202b. The frame 202a is disposed on the connection terminal installation unit 214e. The frame 202a has a hole in which the operation part 201a of the switch terminal 201 is disposed via the hole 214f. The urging part 202b provides an urging force with a predetermined strength that causes the connection terminal 202 to be placed, at a particular position, in the connection terminal installation unit 214e of the connector installation frame 214.

Finally, referring to FIGS. 28A to 28D, examples of screens displayed on the display 117 of the electronic camera 101 when the electronic camera 101 detects services supported by the information processing apparatus 103 via the docking station 102. The examples shown in FIGS. 28A to 28D correspond to FIG. 13. In any example, a captured image and an operation menu are simultaneously displayed.

When the service detected by the CPU of the electronic camera 101 is a print service or a storage service, a "Print" button or a "Store" button is displayed via a transparent touch panel on the display 117 as shown in FIG. 28A. In this case, the first icon 128 is also displayed in the lower right corner of the screen to indicate that the electronic camera 101 is connected to the information processing apparatus 103 via the docking station 102.

When a user selects the "Print" button, printing is started, and an arrow is displayed to the right of the "Print" button displayed on the display 117 to indicate the progress of the printing process, as shown in FIG. 28B. A shaded part of the arrow indicates the amount of data which has already been printed, relative to the total amount of data. This allows a user to visually recognize the status of the printing process. Instead of displaying the arrow, a thumbnail image may be partially shaded to indicate the status of the printing process. In this case, if characters "Store" or "Print" are deleted or displayed in a semi-transparent fashion, it becomes possible for a user to more easily recognize the status of the printing process.

As shown in FIG. 28C, when the "Store" button displayed on the display 117 is selected, an arrow is displayed to the right of the "Store" button to indicate the status of the storage process. A shaded part of the arrow indicates the relative amount of data which has already been stored.

When the printing process or the storing process is completed, as shown in FIG. 28D, a mark 216 corresponding to the selection key is displayed on the display 117 to inform a user that the selection key disposed on the electronic camera 101 are in a usable state. In the printing process, the image displayed on the display 117 is shaded when the printing process is completed. In the case of the storing process, for example, a thumbnail image stored last is displayed on the display 117.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A portable information terminal device cradle apparatus comprising:
   an enclosure including a lower plate an upper plate that has an opening provided therein;
   a recording/reproducing apparatus, for recording and reproducing data, disposed in an inner space enclosed by the enclosure;
   a lid which covers the opening in the enclosure, and which is rotatable to be opened and closed;
   a connector main part, which is provided in the enclosure to be exposed by the opening when the lid is open, and which is connectable to at least one of a portable information terminal device and a cradle assembly placed on the upper plate;

a connector holding part which rotatably supports the connector main part such that the connector main part is rotatable between: (i) a connection position in which connection terminals of the connector main part are exposed for connection with the at least one of the portable information terminal device and the cradle assembly via the opening, and (ii) a storage position at which the connector main part is housed within the enclosure and connection terminals of the connector main part do not face the opening;

a connection mechanism which operatively couples the lid and the connector holding part, and which comprises a power transmission mechanism that mechanically transmits power generated when the lid or the connector holding part is moved manually or by an urging force;

wherein when the lid is closed, the connector main part is caused to rotate, by transmission of power via the power transmission mechanism, from the connection position to the storage position.

2. A portable information terminal device cradle apparatus according to claim 1, wherein the connector holding part includes a plurality of protrusions for guiding the at least one of the portable information terminal device and the cradle assembly, to which the connector main part is connectable, to the connector main part.

3. A portable information terminal device cradle apparatus according to claim 2, wherein the portable information terminal device is connectable to a connector of the cradle assembly, and the cradle assembly is connectable to the connector main part to connect the portable information terminal device to the portable information terminal device cradle apparatus;

wherein the cradle assembly comprises:
   a rotating part which is rotatable about a linear axis and to which the connector of the cradle assembly is mounted;
   a bottom surface, said rotating part being spaced apart from and extending in parallel with the bottom surface; and
   a plurality of switch terminals for detecting a rotation position of the rotating part.

4. A portable information terminal device cradle apparatus according to claim 1, wherein the power transmission mechanism includes a damper.

5. A portable information terminal device cradle apparatus according to claim 4, wherein the damper comprises an intervening silicone-gel material.

6. A portable information terminal device cradle apparatus according to claim 1, wherein the recording/reproducing apparatus comprises a disk drive.

7. A portable information terminal device cradle apparatus according to claim 6, wherein the disk drive comprises an optical disk drive.

8. A portable information terminal device cradle apparatus according to claim 7, wherein the disk drive is a slim disk drive and has a tray insertion slot.

9. A portable information terminal device cradle apparatus according to claim 7, wherein the disk drive is connected to a printer via a signal cable.

10. A portable information terminal device cradle apparatus according to claim 1, wherein a space T between the lid and the connector main part when the lid is open in the connector main part is in the connection position and a space t between the lid and the connector main part when the lid is closed and the connector main part is in the storage position are set such that T>t.

11. A portable information terminal device cradle apparatus according to claim 1, wherein the lower plate includes one of a printed circuit board, a heat radiating plate, and a partition plate.

12. A portable information terminal device cradle apparatus according to claim 1, wherein the portable information terminal device comprises one of a photo viewer for viewing a photo image with audio data, an electronic camera, a portable telephone, a portable telephone with a camera, and a PDA device.

* * * * *